US012736930B2

(12) United States Patent
Donohoe et al.

(10) Patent No.: US 12,736,930 B2
(45) Date of Patent: Sep. 15, 2026

(54) INITIAL OPERATING SETTINGS OPTIMIZATION FOR AGRICULTURAL HARVESTER

(71) Applicant: Deere & Company, Moline, IL (US)

(72) Inventors: Adam J. Donohoe, West Branch, IA (US); Paul T. Readel, Urbandale, IA (US); John P. Just, Ames, IA (US); Jamie E. Moore, Urbandale, IA (US)

(73) Assignee: DEERE & COMPANY, Moline, IL (US)

( * ) Notice: Subject to any disclaimer, the term of this patent is extended or adjusted under 35 U.S.C. 154(b) by 426 days.

(21) Appl. No.: 18/363,184

(22) Filed: Aug. 1, 2023

(65) Prior Publication Data

US 2025/0044754 A1 Feb. 6, 2025

(51) Int. Cl.

*G05B 13/04* (2006.01)
*A01B 79/00* (2006.01)
*A01D 41/127* (2006.01)

(52) U.S. Cl.

CPC .......... *G05B 13/042* (2013.01); *A01B 79/005* (2013.01); *A01D 41/127* (2013.01)

(58) Field of Classification Search

CPC ... A01B 79/005; A01D 99/00; G05B 19/4083
See application file for complete search history.

(56) References Cited

U.S. PATENT DOCUMENTS 4,296,409 A 10/1981 Whitaker et al.
4,527,241 A 7/1985 Sheehan et al.
5,586,033 A 12/1996 Hall
(Continued)

FOREIGN PATENT DOCUMENTS

CN 110583217 A 12/2019
CN 113519260 A 10/2021
(Continued)

OTHER PUBLICATIONS

Statistics (scipy.stats) SciPy v1.10.1 Manual, 2008-2023.
(Continued)

*Primary Examiner* — Scott T Baderman
*Assistant Examiner* — Rokeya Shawali Alam
(74) *Attorney, Agent, or Firm* — KLINTWORTH & ROZENBLAT LLP

(57) ABSTRACT

A harvester operating settings initialization method and system receives, by electronic control architecture having a processor and memory, a plurality of aggregated data sets pertaining to multiple parameters including harvester machine parameters, harvester environment parameters, and crop parameters. The electronic processing architecture applies modeling logic to the plurality of aggregated data sets to determine a selected evaluation group from a plurality of evaluation groups each having multiple of the plurality of aggregated data sets. The electronic control architecture generates an optimization settings data set for machine and crop combinations utilizing the selected evaluation group for one or more geospatial locations. The optimization settings data set is transferred from the electronic control architecture to an operating setting controller of a harvester for initializing settings of operational systems of the harvester.

17 Claims, 12 Drawing Sheets

(56) References Cited

U.S. PATENT DOCUMENTS 5,666,793 A 9/1997 Bottinger
5,712,782 A 1/1998 Weigelt et al.
5,995,895 A 11/1999 Watt et al.
6,119,442 A 9/2000 Hale
6,205,384 B1 3/2001 Diekhans
6,553,300 B2 4/2003 Ma et al.
7,610,125 B2 10/2009 Fitzner et al.
8,161,718 B2 4/2012 Bussmann et al.
8,175,775 B2 5/2012 Foster et al.
8,406,964 B2 3/2013 Baumgarten et al.
9,002,594 B2 4/2015 Wilken et al.
9,009,087 B1 4/2015 Mewes et al.
9,076,118 B1 7/2015 Mewes et al.
9,125,344 B2 9/2015 Baumgarten et al.
9,152,938 B2 10/2015 Lang et al.
9,220,196 B2 12/2015 Baumgarten et al.
9,756,787 B2 9/2017 Heitmann et al.
9,807,926 B2 11/2017 Wilken et al.
9,807,938 B2 11/2017 Wilken et al.
9,872,433 B2 1/2018 Acheson et al.
9,934,538 B2 4/2018 Hunt
10,109,024 B2 10/2018 Bakke et al.
10,126,929 B2 11/2018 Baumgarten et al.
10,194,575 B2 2/2019 Schmidt
10,310,455 B2 6/2019 Blank et al.
10,426,087 B2 10/2019 Bruns et al.
10,437,243 B2 10/2019 Blank et al.
10,462,957 B2 11/2019 Clement et al.
10,586,158 B2 3/2020 Chen et al.
10,782,672 B2 * 9/2020 Blank ................ G05B 19/4083
11,122,739 B2 9/2021 Heitmann
11,191,215 B1 12/2021 Robertson
11,197,417 B2 12/2021 Corban et al.
11,284,564 B2 3/2022 Bormann et al.
11,297,767 B2 4/2022 Rademacher
11,304,367 B2 4/2022 Schröder et al.
11,423,305 B2 8/2022 Davis
11,497,157 B2 11/2022 Meyer Zu Helligen
11,589,507 B2 2/2023 Blank et al.
11,612,103 B2 3/2023 Bormann et al.
12,035,649 B2 7/2024 Antich
2003/0014171 A1 1/2003 Ma et al.
2003/0066277 A1 4/2003 Behnke
2003/0216158 A1 11/2003 Bischoff
2003/0229432 A1 12/2003 Ho et al.
2004/0186597 A1 9/2004 Wippersteg et al.
2005/0241285 A1 11/2005 Maertens et al.
2005/0245300 A1 11/2005 Maertens et al.
2006/0271243 A1 11/2006 Behnke et al.
2007/0005209 A1 1/2007 Fitzner et al.
2008/0268927 A1 10/2008 Farley et al.
2009/0088932 A1 4/2009 Diekhans et al.
2009/0192654 A1 7/2009 Wendte et al.
2009/0312920 A1 12/2009 Boenig et al.
2010/0071329 A1 3/2010 Hindryckx et al.
2010/0217474 A1 8/2010 Baumgarten et al.
2012/0004813 A1 1/2012 Baumgarten et al.
2013/0184944 A1 7/2013 Missotten et al.
2014/0129048 A1 5/2014 Baumgarten et al.
2014/0129192 A1 5/2014 Blank et al.
2014/0171161 A1 6/2014 Bischoff
2014/0215984 A1 8/2014 Bischoff
2015/0142308 A1 5/2015 Schmidt
2015/0293507 A1 10/2015 Burns et al.
2016/0052525 A1 2/2016 Tuncer et al.
2016/0066505 A1 3/2016 Bakke et al.
2016/0086032 A1 3/2016 Pickett
2016/0086291 A1 3/2016 Hunt
2016/0286720 A1 10/2016 Heitmann et al.
2016/0286721 A1 10/2016 Heitmann et al.
2016/0286722 A1 10/2016 Heitmann et al.
2016/0309656 A1 10/2016 Wilken et al.
2017/0049045 A1 2/2017 Wilken et al.
2017/0090445 A1 3/2017 French, Jr.
2017/0094901 A1 4/2017 French, Jr.
2017/0124463 A1 5/2017 Chen et al.
2017/0160916 A1 6/2017 Baumgarten et al.
2017/0185086 A1 6/2017 Sauder et al.
2017/0188515 A1 7/2017 Baumgarten et al.
2017/0325394 A1 11/2017 Clement et al.
2018/0196441 A1 7/2018 Muench et al.
2018/0271015 A1 9/2018 Redden et al.
2018/0317385 A1 11/2018 Wellensiek et al.
2018/0332767 A1 11/2018 Muench et al.
2018/0359917 A1 12/2018 Blank et al.
2018/0359919 A1 12/2018 Blank et al.
2019/0021226 A1 1/2019 Dima et al.
2019/0050948 A1 2/2019 Perry et al.
2019/0064817 A1 2/2019 Schmitt et al.
2019/0069470 A1 3/2019 Pfeiffer et al.
2019/0082597 A1 3/2019 Maney
2019/0090421 A1 3/2019 Bollin et al.
2019/0183045 A1 6/2019 Rademacher
2019/0223379 A1 7/2019 Gilmore et al.
2019/0327889 A1 10/2019 Borgstadt
2019/0327893 A1 10/2019 Hamilton et al.
2019/0343043 A1 11/2019 Bormann et al.
2019/0354081 A1 11/2019 Blank et al.
2019/0364732 A1 12/2019 Blank et al.
2020/0084966 A1 3/2020 Corban et al.
2020/0090094 A1 3/2020 Blank
2020/0128734 A1 4/2020 Brammeier et al.
2020/0183406 A1 6/2020 Borgstadt
2020/0245557 A1 8/2020 Reinecke
2020/0269859 A1 8/2020 Blank et al.
2020/0296892 A1 9/2020 Donini et al.
2020/0323133 A1 * 10/2020 Anderson ............ A01B 79/005
2020/0323134 A1 10/2020 Darr et al.
2020/0326674 A1 10/2020 Palla et al.
2020/0375092 A1 12/2020 Pankaj et al.
2020/0375104 A1 12/2020 Yu et al.
2020/0402184 A1 12/2020 Dasgupta et al.
2021/0007277 A1 1/2021 Anderson
2021/0015041 A1 1/2021 Bormann et al.
2021/0015045 A1 1/2021 Vandike et al.
2021/0105940 A1 4/2021 Hodson
2021/0120736 A1 4/2021 Wang et al.
2021/0129853 A1 5/2021 Appleton et al.
2021/0176911 A1 6/2021 Marchesan
2021/0176916 A1 6/2021 Sidon et al.
2021/0185913 A1 6/2021 Garton et al.
2021/0195836 A1 7/2021 Koch et al.
2021/0235621 A1 8/2021 Pankaj et al.
2021/0264252 A1 8/2021 Davis
2021/0289701 A1 9/2021 White et al.
2021/0298233 A1 9/2021 Palla et al.
2021/0302969 A1 9/2021 Palla et al.
2021/0315159 A1 10/2021 Kyochika et al.
2021/0321554 A1 10/2021 Liu et al.
2021/0321567 A1 10/2021 Sidon et al.
2021/0378176 A1 12/2021 Leenknegt et al.
2022/0110238 A1 4/2022 Vandike et al.
2022/0110246 A1 4/2022 Vandike et al.
2022/0110253 A1 4/2022 Anderson et al.
2022/0110262 A1 4/2022 Vandike et al.
2022/0113727 A1 4/2022 Vandike et al.
2022/0117143 A1 4/2022 Kraus et al.
2022/0125032 A1 4/2022 Ascherl
2022/0132736 A1 5/2022 Meyers et al.
2022/0132737 A1 5/2022 Anderson et al.
2022/0176818 A1 6/2022 Piscopo et al.
2022/0207852 A1 6/2022 Sharma et al.
2022/0210975 A1 7/2022 Digman
2022/0225568 A1 7/2022 Töniges et al.
2022/0232763 A1 7/2022 Palla et al.
2022/0232770 A1 7/2022 Yanke et al.
2022/0304227 A1 9/2022 Hill et al.
2022/0304231 A1 9/2022 Faust et al.
2023/0031013 A1 2/2023 Faust et al.
2023/0035890 A1 2/2023 Mckinney et al.
2023/0067106 A1 3/2023 Antich
2023/0072812 A1 3/2023 Hidetaka et al.
2023/0099971 A1 3/2023 Baumgarten et al.
2023/0315109 A1 10/2023 Suzuki et al.

(56) References Cited

U.S. PATENT DOCUMENTS

| | | | |
|---|---|---|---|
| 2024/0065152 | A1 | 2/2024 | Bormann et al. |
| 2024/0065155 | A1 | 2/2024 | Thiesmann et al. |
| 2024/0152786 | A1 | 5/2024 | Kocer |
| 2024/0260508 | A1 | 8/2024 | Missotten et al. |
| 2025/0044754 | A1 | 2/2025 | Donohoe et al. |

FOREIGN PATENT DOCUMENTS

| | | | |
|---|---|---|---|
| CN | 113348851 | B | 8/2022 |
| CN | 114846991 | A | 8/2022 |
| CN | 114915637 | A | 8/2022 |
| CN | 115280960 | A | 11/2022 |
| CN | 115643895 | A | 1/2023 |
| CN | 111226609 | B | 2/2023 |
| DE | 102019103923 | A1 | 8/2020 |
| EP | 2322028 | B1 | 2/2013 |
| EP | 1619517 | B1 | 6/2013 |
| EP | 3097759 | A1 | 11/2016 |
| EP | 3242257 | A1 | 11/2017 |
| EP | 2322029 | B2 | 6/2018 |
| EP | 2138027 | B9 | 10/2018 |
| EP | 3542608 | A1 | 9/2019 |
| EP | 3400774 | B1 | 8/2020 |
| EP | 3459338 | B1 | 9/2020 |
| EP | 3766330 | A1 | 1/2021 |
| EP | 3818803 | A1 | 5/2021 |
| EP | 3626038 | B1 | 3/2022 |
| EP | 3766330 | B1 | 6/2024 |
| EP | 4424133 | A1 | 9/2024 |
| IN | 202241032643 | A | 6/2022 |
| IN | 202431013918 | A | 3/2024 |
| WO | WO10003421 | A1 | 1/2010 |
| WO | WO20110920 | A1 | 6/2020 |
| WO | WO21131317 | A1 | 7/2021 |
| WO | WO22118572 | A1 | 6/2022 |
| WO | WO 2024240842 | A1 | 11/2024 |

OTHER PUBLICATIONS

Claas Telematics Brochure at Claas.com, https://www.claasharvestcentre.com/media/1316620/telematics-brochure.pdf, May 16, 2014.

Claas Operating Tips Telematics #12 Data Export, YouTube 2020, https://www.youtube.com/watch?v=zL9YzyRipuQ.

Claas Operating Tips Telematics #11 Combine League, Facebook, Jun. 2, 2018, https://www.facebook.com/watch/?v=2172499802767030.

* cited by examiner

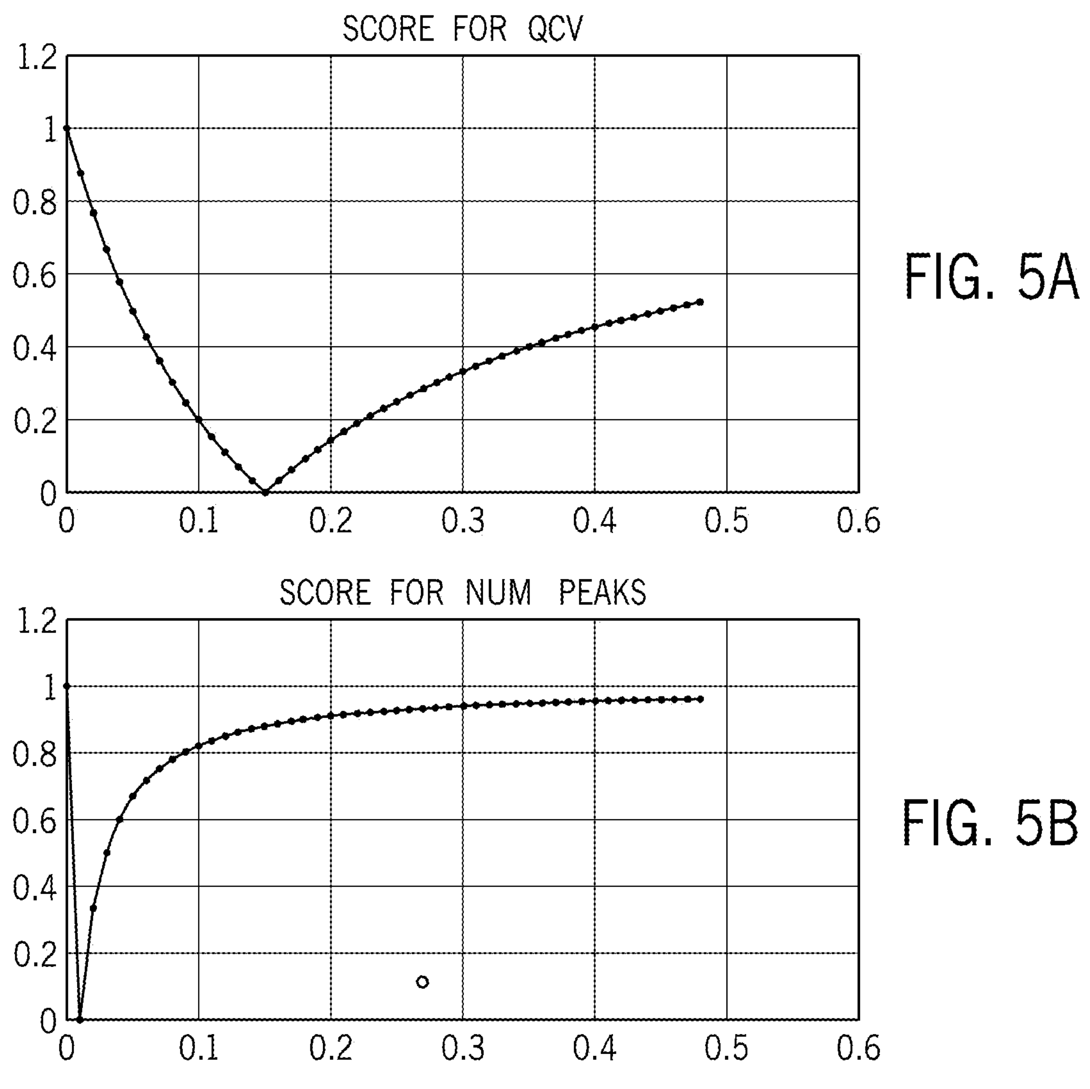
FIG. 5A
FIG. 5B
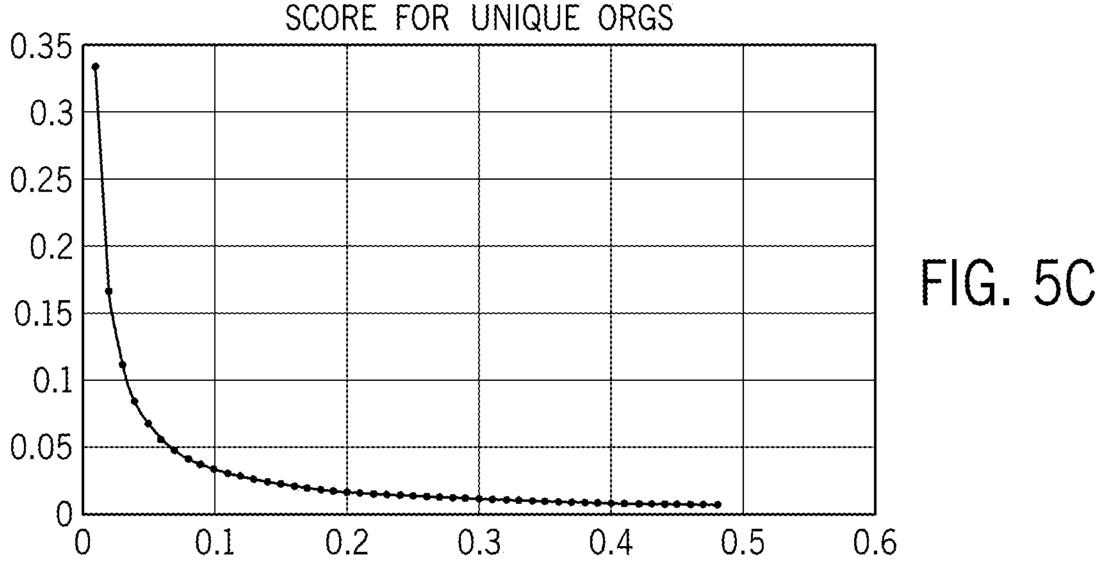
FIG. 5C

INITIAL OPERATING SETTINGS OPTIMIZATION FOR AGRICULTURAL HARVESTER

STATEMENT OF FEDERALLY SPONSORED RESEARCH OR DEVELOPMENT

Not applicable.

FIELD OF THE DISCLOSURE

This disclosure generally relates to systems and methods for initializing operating settings for an agricultural harvester or the like, and more specifically to such systems and methods that optimize the operating settings based on aggregated data.

BACKGROUND OF THE DISCLOSURE

Heavy work vehicles may be employed in the agricultural industry to prepare fields, and plant and harvest many types of crops (e.g., oats, paddy, sunflowers, corn, soybeans, wheat, and canola, etc.). Numerous factors impact operational efficiency, including the machine platform employed, the variety of the crop, and the environmental and soil conditions in the field being worked, which may vary greatly given the geographic region of the field. Agricultural harvesters, such as combine harvesters, may be used to harvest, thresh, and collect crop material for later distribution to consumers. Generally, combine harvesters move over crops in large swathes and intake cut crop that is processed onboard the harvester to separate unbroken grain from broken grain and material other than grain ("MOG"). Combine harvesters may be under operator or autonomous control both of which require initial operating settings to begin harvesting operations. The better suited the initial operating settings to the field being harvested, the better the efficiency of the harvesting operation.

SUMMARY OF THE DISCLOSURE

The disclosure provides a system and a method for optimizing the initial operating settings for an agricultural harvester.

In particular, a harvester operating settings initialization method comprises receiving, by electronic control architecture having a processor and memory, a plurality of aggregated data sets pertaining to multiple parameters including harvester machine parameters, harvester environment parameters, and crop parameters. The electronic control architecture applies modeling logic to the plurality of aggregated data sets to determine a selected evaluation group from a plurality of evaluation groups each having multiple of the plurality of aggregated data sets. The electronic control architecture generates an optimization settings data set for machine and crop combinations utilizing the selected evaluation group for one or more geospatial locations. The optimization settings data set is transmitted from the electronic processing architecture to an operating setting controller of a harvester for initializing settings of operational systems of the harvester.

In various embodiments of the disclosed method, each of the plurality of evaluation groups includes a crop-specific set of the plurality of aggregated data sets and a machine-specific set of the plurality of aggregated data sets. Also, the modeling logic includes generating a plurality of data constructs associated with the plurality of evaluation groups by processing the plurality of aggregated data sets associated with the plurality of evaluation groups using one or more statistical modeling techniques. The modeling logic also includes generating a plurality of scores for the plurality of evaluation groups by assessment of the plurality of data constructs according to one or more scoring pillars. The selected evaluation group of the plurality of evaluation groups is determined based on the plurality of scores.

In these and other embodiments, the statistical modeling techniques include kernel density estimation and peak detection, and the scoring pillars include a spread metric, a peak metric, and a generalization metric. The spread metric resolves a spread score that elevates the data constructs of the evaluation groups with aggregated data sets that vary by more than a minimum variance value and less than a maximum variance value. The peak metric resolves a peak score that elevates the data constructs of the evaluation groups with aggregated data sets that have a quantity of identifiable prominent peaks less than a maximum peak quantity value. The generalization metric resolves a generalization score that elevates the data constructs of the evaluation groups with aggregated data sets that have a membership above a minimum membership value and less than a maximum membership value.

The parameters comprising the plurality of aggregated data sets include harvester machine data, operator behavior data, crop data, soil data, weather data, and field image data. Applying the modeling logic includes receiving machine and crop inputs identifying a unique one of the machine and crop combinations and applying to the harvester the optimization settings data set corresponding to the identified machine and crop combination. The machine and crop inputs are acquired from onboard the harvester or from offboard the harvester. When acquired from offboard the harvester, the modeling logic includes receiving a field input in terms of a target field input and a harvest date input. The method further includes building a field geometry associated with the target field input, acquiring environment and soil inputs associated with the target field input and the harvest date input, determining anticipated field data associated with the environment and soil inputs for the field geometry, and incorporating the anticipated field data with the machine and crop inputs to identify the identified machine and crop combination. Generating the optimization settings data set includes establishing a database of optimized settings data for multiple unique ones of the machine and crop combinations.

In these and other embodiments, the operational systems of the harvester include a cleaning fan, a thresher fan speed, a thresher, a chaffer, and a sieve. Transferring the optimization settings data set from the electronic processing architecture to the operating setting controller of a harvester includes transmitting the optimization settings data set to the harvester wirelessly from a remote facility during operation of the harvester. The method may further include displaying the optimization settings data set as a settings map on a display onboard the harvester or actively controlling one or more actuators of the operational system of the harvester.

Another aspect of the disclosure provides a harvester operating settings initialization system comprising a non-transitory machine-readable medium containing instructions to direct a processor to perform the foregoing method. Specifically, the system is configured to: receive a plurality of aggregated data sets pertaining to multiple parameters including harvester machine parameters, harvester environment parameters, and crop parameters; apply modeling logic to the plurality of aggregated data sets to determine a selected evaluation group from a plurality of evaluation groups each having multiple of the plurality of aggregated data sets; generate an optimization settings data set for machine and crop combinations utilizing the selected evaluation group for one or more geospatial locations; and initialize operational systems of the harvester according to the optimization settings data set. The system is configured to perform the additional functions of the aforementioned method and has other features and functionality.

The details of one or more embodiments are set forth in the accompanying drawings and the description below. Other features and advantages will become apparent from the description, the drawings, and the claims.

BRIEF DESCRIPTION OF THE DRAWINGS

FIGS. 5A-5C are plots of example scoring pillars for the example evaluation groups;

Like reference symbols in the various drawings indicate like elements.

DETAILED DESCRIPTION

The following describes one or more example embodiments of the disclosed system and method, as shown in the accompanying figures of the drawings described briefly above. Various modifications to the example embodiments may be contemplated by one of skill in the art. Discussion herein focuses on the example application of a system and a method associated with an agricultural harvester as a combine harvester, but the disclosed embodiments may be applicable to other types of work vehicles in agriculture as well as in other industries than agricultural, such as construction, forestry, mining, etc.

Combine harvesters may traverse fields cutting crops (e.g., corn, wheat, soy, etc), threshing the grains, removing MOG, as well as other materials, such as straw. The efficiency of the harvesting process may be directly related to the settings of the machine. To achieve various performance targets (e.g., maximizing the amount of grain that is harvested per acre, while also maintaining a minimum percentage of clean grain in the collection bin) operators may rely on their past experience to set or adjust machine settings. Human error and an incomplete knowledge of the environmental conditions, however, may render operators unable to maximize the efficiency of the harvesting process.

In various embodiments of the present disclosure, the initial operating settings may be preoptimized based on previously collected and processed data. For example, in some embodiments a computational model may be built that processes aggregated data sets into evaluation groups. These numerous and diverse evaluation groups may be abstracted into data constructs, which are then scored to select the best operating settings that may be stored as a database for later or real-time selection and use to set or adjust the operational systems of a given combine harvester.

In some embodiments of the present disclosure, the system and method may focus on the settings for certain operational systems of the example combine harvester that are deemed primary, which, for example, may include optimizing settings for the speed of the cleaning fan, the speed and/or clearance of the thresher or separator, the position of the chaffer, and the position of the sieve, as will be discussed herein. In some embodiments, the system and method may also focus on the performance measures of clean grain percentage and grain loss. Other operational systems and settings and performance measures may be added to or replace some or all of these systems, settings, and measures in various or other embodiments of the present disclosure. These operating settings and performance measures will be better understood with reference to an example combine harvester, which will now be described.

Example Combine Harvester

Figure 1:
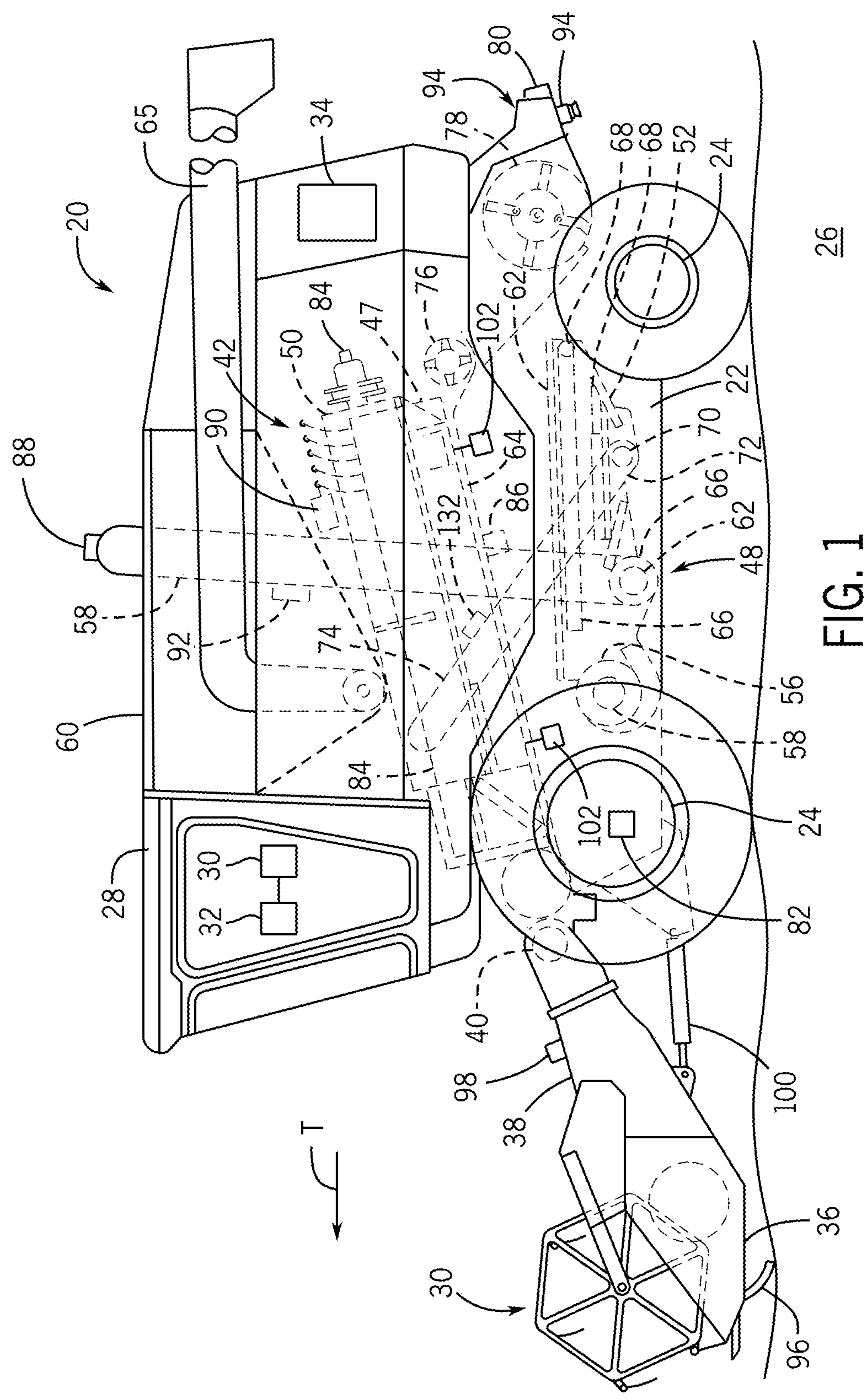
FIG. 1 is a schematic view of an example agricultural harvester in the form of a combine harvester which may utilize the operating settings optimization system and method disclosed herein.

The initial operating settings operation system and method of this disclosure will be described in the context of an example combine harvester 20, as shown in FIG. 1. It will be understood that the combine harvester 20 is shown schematically for simplicity and is provided only to illustrate the principles of various embodiments of the present disclosure. As such, the combine harvester 20 described herein is merely a non-limiting example that provides context in which the system and method of the disclosure may be better understood. Other agricultural harvesters may comprise different combinations of components or systems for processing crops.

Referring now to FIG. 1, the example combine harvester 20 includes a chassis 22 with ground-engaging wheels (or tracks) 24. The wheels 24 are rotatably mounted to the chassis 22 and engage with the ground or field 26 to propel the combine harvester 20 in a travel direction T. An operator cabin 28, may also be mounted to the chassis 22, to house an operator as well as various operator interface devices 30 and one or more display devices 32 to control the combine harvester 20 and provide input/output functionality for the operator. Apart from the display devices 32, the operator interface devices 30 may include various video and audio devices for providing video and audio information, haptic devices that provide haptic feedback, levers, joysticks, steering wheels, pedals, buttons, and so on. Operator interface devices can also be a set of inputs displayed on the display devices 32, for example, links, icons, or other user actuatable mechanisms. It should be noted that autonomous operation of the combine harvester 20 may be possible in which case the operator cabin 28, the interface devices 30, and the display devices 32 may be omitted. The combine harvester 20 may be powered by an internal combustion engine 34, alone or in combination with one or more electric machines (not shown). A fully electrified power plant, in the form of one or more electric machines, is also contemplated, in which case the engine 34 may be omitted.

A header 36 is mounted at the front of the combine harvester 20 to cut and gather crop material from the field 26. The header 36 is supported by a feederhouse 38, which is pivotally mounted to the chassis 22. The feederhouse 38 may include, for example, an inclined conveyor (not shown) for transport of cut crop material from the header 36 into the internal areas of the combine harvester 20. After passing over a guide drum or feed accelerator 40, the crop material from the feederhouse 38 reaches a generally fore-aft oriented thresher (or separator) 42. Other embodiments may include laterally oriented or other threshing devices (not shown). In the example combine harvester 20 depicted, the thresher 42 includes a rotor 44, on which various threshing elements are mounted. The rotor 44 rotates above one or more grated or sieved threshing baskets or concaves 46, such that crop material passing between the rotor 44 and the concave 46 is separated, at least in part, into grain and chaff (or MOG). The MOG is carried rearward and released from between the rotor 44 and the concaves 46. Most of the grain (and some of the MOG) separated in the thresher 42 falls downward through apertures in the concaves 46. A thresher (or separator) loss sensor 47 senses grain loss in the thresher 42 as separate grain-loss signals or a combined or aggregate signal.

Grain and MOG passing through the concaves 46 fall (or are actively fed) into a cleaning subsystem or cleaning shoe 48 for further cleaning. The cleaning shoe 48 includes a cleaning fan 50, driven by a motor 52, that generates generally rearward air flow, as well as a sieve 54 and a chaffer 56. The sieve 54 and the chaffer 56 are suspended with respect to the chassis 22 by a thresher actuation arrangement 58, which may include pivot arms and rocker arms mounted to disks (or other devices). As the cleaning fan 50 blows air across and through the sieve 54 and the chaffer 56, the actuation arrangement 58 may cause reciprocating motion of the sieve 54 and the chaffer 56 via movement of the rocker arms. The combination of this motion of the sieve 54 and the chaffer 56 with the air flow from the cleaning fan 50 causes the lighter chaff to be blown upward and rearward within the combine harvester 20, while the heavier grain falls through the sieve 54 and the chaffer 56 and accumulates in a clean grain trough 60 near the base of the combine harvester 20. A clean grain auger 62 disposed in the clean grain trough 60 carries the material to one side of the combine harvester 20 and deposits the grain in the lower end of a clean grain elevator 64. The clean grain is carried upward by the clean grain elevator 64 until it reaches the upper exit of the clean grain elevator 64. The clean grain is then released from the clean grain elevator 64 and falls into a grain storage tank 66. The clean grain with the grain storage tank 66 may be carried onboard the combine harvester 20 or offloaded by the unloading auger 65.

Most of the grain entering the cleaning subsystem passes downward through the chaffer 56, then through the sieve 54. Of the material carried by air from the cleaning fan 50 to the rear of the sieve 54 and the chaffer 56, smaller MOG particles are blown out of the rear of the combine harvester 20. Larger MOG particles and grain are not blown off the rear of the combine harvester 20, but rather fall off the cleaning shoe 48 and onto shoe loss sensors 68 located to each side of the cleaning subsystem, which are configured to detect shoe losses. Cleaning shoe loss sensors 68 can provide output signals indicative of the quantity of grain loss at both the right and left sides of the cleaning shoe 48. In one example, the shoe loss sensors 68 are strike sensors which count grain strikes per unit of time (or per unit of distance traveled) to provide an indication of the cleaning shoe grain loss in individual signals or a combined or aggregated signal.

Heavier material that is carried to the rear of the chaffer 56 falls out of the combine harvester 20 and can be partially detected by the shoe loss sensors 68. Heavier material that is carried to the rear of the sieve 54 falls onto a pan and is then conveyed by gravity downward into a grain tailings trough 70. Such heavier "tailings" are typically a mixture of grain and MOG. A tailings auger 72 is disposed in the tailings trough 70 and carries the grain tailings to the opposite side of the combine harvester 20 and into a grain tailings elevator 74. In a passive tailings implementation, the grain tailings elevator 74 carries the grain tailings upward and deposits them on a forward end of the rotor 44 to be re-threshed and separated. The grain tailings are then received by a discharge beater 76 where the remaining kernels of grain are released. The now-separated MOG is released behind the combine harvester 20 to fall upon the ground in a windrow or are delivered to a residue subsystem that can include a chopper 78 and a spreader 80 where it can be chopped by the chopper 78 and spread on the field 26 by the spreader 80. Alternatively, in an active tailings implementation, the grain tailings elevator 74 may deliver the grain tailings upward to an additional threshing unit (not shown) that is separate from the thresher 42 and where the grain tailings are further threshed before being delivered to the main crop flow at the front of the cleaning shoe 48.

The combine harvester 20 includes other sensor and actuator devices in addition to the aforementioned thresher loss sensor 47, the shoe loss sensors 68, the thresher actuation arrangement 58, and the cleaning fan motor 52. For example, the combine harvester 20 can include a ground speed sensor 82 that senses the travel speed of combine harvester 20 over the field 26, for example, by sensing the speed of rotation of the wheels, the drive shaft, the axle, or other components. The travel speed can also be sensed by a positioning system, such as a global positioning system (GPS), a dead reckoning system, a LORAN system, or a wide variety of other systems or sensors that provide an indication of travel speed. Other sensors and actuators can include a rotor speed sensor 84, a threshing gap sensor 86, a grain yield sensor 88, a threshing load sensor 90, a clean grain quality sensor 92, a straw quality sensor 94, a header height sensor 96, a feederhouse mass flow sensor 98, a header actuator 100, and threshing gap actuators 102.

Thus, the combine harvester 20 is capable of determining, setting, and monitoring numerous operational parameters, such as header height, harvester speed, threshing speed, separating speed, threshing clearance, cleaning fan speed, chafer positions, sieve positions, feed rate, reel position, reel speed, header belt speeds, deck plate positions, header speeds, chopper speed, chopper counter knife position, spreader speeds and spreader vane positions. A subset of the numerous available parameters may take on greater significance in the efficient harvesting of the combine harvester 20 and may, therefore, be the focus of the settings optimization scheme. For example, it may be beneficial to optimize the cleaning fan speed, threshing speed, threshing clearance, chaffer position, and sieve position. Likewise, various performance measures may be more significant, such as clean grain percentage and grain loss. While these factors are included in the discussion below, other operational parameters and performance measures may be considered and prioritized when optimizing settings.

The foregoing and other components may be configured for interfacing the various systems of the combine harvester 20 with an electronic control system carried onboard the machine or in part at a remote fixed facility or mobile station, which will now be described in more detail in connection with example machine-server data and control architecture 200 ("MSDCA").

Example Machine-Server Data and Control Architecture

Figure 2:
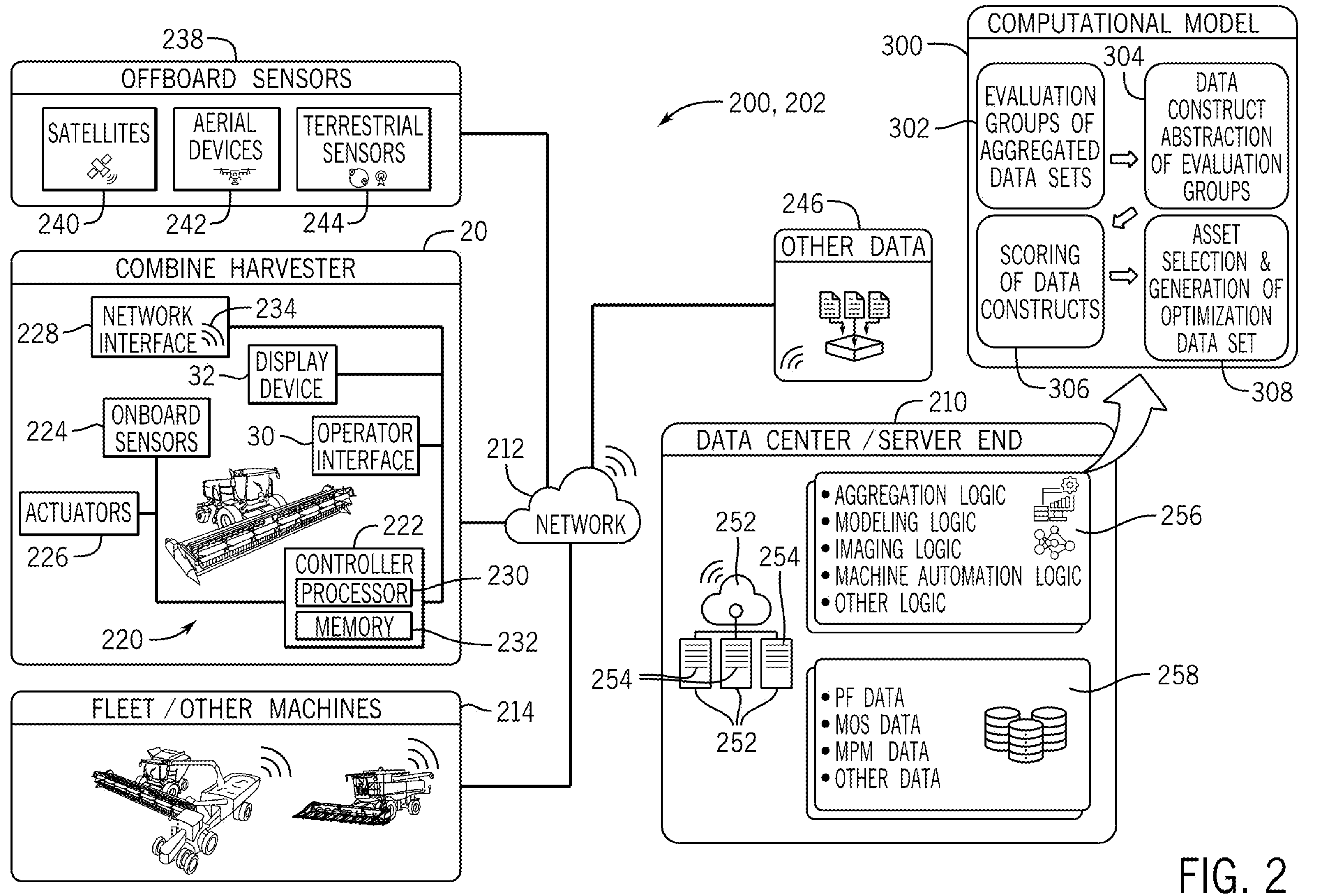
FIG. 2 is a schematic data flow diagram for executing the operating settings optimization system and method with the example combine harvester of FIG. 1.

Referring also to FIG. 2, there is shown an example MSDCA 200 suitable for carrying-out embodiments of an initial operating settings optimization ("IOSO") system 202 of the present disclosure. Generally, the IOSO system 202 serves to optimize the initial settings of various operational parameters of agricultural harvesters, such as the combine harvester 20. The optimization of the harvesters may be performed ahead of time (i.e., prior to operation) by the original equipment manufacturer ("OEM") at the time of assembly without the need for a wireless communication network. However, in the illustrated example, the MSDCA 200 interfaces wirelessly with connected harvesters and other work vehicles to acquire and transfer data, execute modeling and control software, and process protocols for communication. The MSDCA 200 allows for both ahead-of-time optimization and real-time optimization, both at initialization of the machine and during operation. It will be understood that, while the MSDCA 200 described below provides enhanced functionality and benefits, it is only one non-limiting example.

The MSDCA 200 includes a data center/server end 210 that communicates with the combine harvester 20 as well as any number of additional agricultural harvesters and other work machines 214 over a communications network 212. These additional harvesters and other work machines 214 may be geographically localized or distributed over any number of discrete or federated geographical locations and areas of any size and shape according to arbitrary or other (e.g., geometric or geopolitical) boundaries of any resolution. For example, the additional agricultural harvesters and other work machines 214 may be distributed across a relatively broad geographical range, such as state, country (e.g., the United States), multiple countries, or other developed regions of the globe. It should be noted that the additional harvesters may be like or different combine harvesters or various other agricultural harvesters (e.g., cotton, sugarcane, etc.), and the other work machines may be non-harvester agricultural vehicles (e.g., agricultural tractors, sprayers, balers, etc.). Moreover, these additional work machines need not be agricultural, but may include work machines for various other industries, such as the construction, forestry, and/or mining industries.

With regard to the combine harvester 20, an onboard control system 220 includes a controller 222 that is operably coupled to the operator interface 30, the display device 32, the various onboard sensors and actuators described above and referred to herein collectively by reference numbers 224 and 226, respectively, and a network interface 228. The various data connections between these components are represented by a number of signal lines generally representative of wired and/or wireless data connections. The control system 220, controller 222 or other control architecture referred to herein can assume any form suitable for performing the functions described, and is used in a non-limiting sense to generally refer to the processing architecture or system of a work machine (e.g., the combine harvester 20) or other computing device or group of devices. The MSDCA 200 and controller 222 can encompass or may be corresponding to any practical number of processors, control computers, computer-readable memories, power supplies, storage devices, interface cards, and other standardized components, and may also include or cooperate with any number of firmware and software programs or computer-readable instructions designed to carry-out the various process tasks, calculations, and control/display functions described herein, all represented by processor 230. Such computer-readable instructions may be stored within a non-volatile sector of a local onboard memory 232, which is accessible to the controller 222. While generically illustrated as a single block, the memory 232 can encompass any number and type of storage media suitable for storing computer-readable code or instructions, as well as other data utilized to support the operation of the network-connected combine harvester 20. The memory 232 may be integrated into the controller architecture in various embodiments such as, for example, a system-in-package, a system-on-a-chip, or another type of microelectronic package or module.

The onboard sensors 224 of the combine harvester 20, some described functionally above, can include various different types of sensor architectures for providing the controller 222 with input pertaining to the operational parameters of the combine harvester 20, data pertaining to the surrounding environment of the combine harvester 20, and other such information useful by the IOSO system 202 in the manner described below. Similarly, the actuators 226, some described functionally above, onboard the combine harvester 20 may assume different forms for performing functions supporting harvester operation. The type and purpose of the sensors and actuators integrated into a particular harvester or other work vehicle may differ somewhat or significantly, some of the onboard sensors 224 may include some form of receiver, chip set, or the like for determining position utilizing a satellite navigation system including, but not limited to, GPS, Galileo, Global Navigation Satellite System (GNSS or GLONASS), Compass-IGS01, and combinations of the satellites included therein. The onboard sensors 224 can also include various image sensors or cameras, temperature sensors, moisture sensors, wear sensors, vibration sensors, and/or sensors for measuring radio frequency (RF) signals.

As introduced above, the operator interface 30 may include various mechanical and electronic devices, such as a steering wheel, joysticks, levers, and so on positioned about the operator cabin 28 of the combine harvester 20. Additionally or alternatively, some portion of the operator interface 30 may be integrated into the display device 32, such that the operator interface 30 may include physical inputs (e.g. buttons, switches, dials, etc.) on or near the display device 32, a touchscreen module integrated into the display device 32, or a cursor input device (e.g., a joystick, trackball, or mouse) for positioning a cursor utilized to interface with GUI elements generated on the display device 32. The display device 32 can be any image-generating device configured for operation within the operator cabin 28 of the combine harvester 20, including one or more dedicated display consoles and various heads-up display projectors.

The network interface 228 can be any device or module providing access to the network 212, such as a wireless (e.g., WiFi or cellular) transceiver or datalink including an antenna 234. Modern combine harvesters, and other modern agricultural vehicles, are now commonly equipped with such wireless transceivers to support telematics, precision agriculture applications, and other related functions. Further, the network interface 228 can also include a satellite receiver and may receive data via a satellite link in certain instances. Additionally, or alternatively, the network interface 228 may allow communication with nearby cellular towers or terrestrial nodes, such as a wireless RF nodes included in a controller area network ("CAN") established over an agricultural area (e.g., a field or group of fields) within which the combine harvester 20 operates. Suitable equipment for usage as the network interface 228 includes the line of telematics receivers and transmitters commercially offered by Deere & Company, currently headquartered in Moline, Ill., and marketed under the brand name "JDLink™". Such examples notwithstanding, the particular form assumed by the network interface may vary, providing that network interface 228 provides persistent or intermittent wireless conductivity to the network 212.

The communications network 212 broadly encompasses any number and type of networks, systems, or architectures for transmitting data between the various components or nodes of the MSDCA 200 utilizing any common protocols and signaling schemes. These components or nodes include the combine harvester 20, the additional harvesters and other work machines 214, offboard sensors 238, such as orbital satellites 240, aerial devices (e.g., drones) 242, and terrestrial sensors 244 (e.g., geospatially fixed imaging or environmental sensors of the type of certain of the onboard sensors described above) for acquiring air and field data, possibly other network-connected data sources 246, such as other remote weather centers and location condition information stations, and the data center/server end 210. The network 212 can include one or more open content delivery networks, Virtual Private Networks ("VPN"), the Internet, cellular networks, and various other communications networks implemented in accordance with transmission control protocol/Internet protocol ("TCP/IP") architectures or other conventional protocols. In various embodiments, the network 212 may further encompass one or more Local Area Networks ("LAN"), wide area networks ("WAN"), CANs, and similar wireless networks. In certain cases, wider networks (e.g., WANs or CANs) may be employed to provide network connectivity when a particular machine is operating within a given field or other agricultural space. In still other embodiments in which in-field connectivity may be non-existent, unreliable, or impractical for rapid data exchange, certain processes may be conducted during time frames in which a network-connected work vehicle is brought into range of a wireless network, such as a LAN or WAN, established in an area in which the work vehicle is stored when not in use.

The data center/server end 210 can be implemented utilizing a cloud computing (distributed server) architecture in various embodiments. Whether implemented utilizing a distributed server architecture, a localized server or server farm operating on the Internet, or in some other manner, the data center/server end 210 may provide software applications for executing onboard the network-connected work vehicles, and give access to servers, storage, databases, and other resources supporting the operation of such software applications. The data center/server end 12 may be described as including a processor architecture 250 (e.g., one or more processors) and input/output ("I/O") devices 252. The I/O devices 252 include a network interface enabling connection to the network 212 and access to a memory 254 storing one or more databases 256, 258.

The data center/server end 210 may maintain the database 256 as a logic database in which a library of data aggregation, modeling metrics, machine automation, and other instruction sets, which may include or consist of control logic, algorithms, or other software solutions or engines, are stored for use by the IOSO system 202, as will be described below. Additionally, or alternatively, various machine learning and artificial or augmented intelligence engines, such as various neural networks (e.g., convolutional neural networks) may be utilized by the data center/server end 210 during the acquisition, organization, processing (including image processing), modeling, and outputting (including machine automation) effected using the data from the various data sources employed by the IOSO system 202. The metrics data stored within the logic database 256 may be arranged or sorted into different categories or classifications with the logic database 256 containing any number of categories and sub-categories. The metric data can be a set of data parameters for entry into a control program that may be executed locally onboard the combine harvester 20 or other work machines 214 or may be executed at the data center/server end 210 as part of the MSDCA 200.

The database 258 may also be accessed by the data center/server end 210 and store data pertaining to a myriad of predictive factors ("PF"), machine operating settings ("MOS"), and machine performance metrics ("MPM") that may be used by the IOSO system 202, as described below. The database 258, may thus be considered a factor-settings-performance ("FSP") database. The FSP database 258 may be updated manually or automatically periodically or continuously at prescribed intervals utilizing data received by the data center/server end 210 from various sources, for example, the onboard sensors 224 of the combine harvester 20, the additional harvesters or other work machines 214, the offboard sensors 238, and the other data sources 246.

By way of non-limiting examples for the combine harvester 20, the PF data acquired by the data center/sever end 210 and data stored in the FSP database 258 may include factors or variables such as: machine classification (e.g., model, series, class, family), machine usage (e.g., age, hours of operation), header details (e.g., type, size, configuration), machine attitude telemetry (e.g., pitch and roll), operator history (e.g., identification, operating preferences), harvested crop details (e.g., crop type, crop variety or sub-type, biomass yield), crop growth preferences (e.g., sun exposure, soil type, nutrients), soil conditions (e.g., type, moisture content, nutrient content), field conditions (e.g., slope, terrain, row spacing, weed type/density, crop state), environmental and atmospheric conditions (e.g., humidity, temperature, dewpoint, wind speed/direction, sun duration/angle, time of day), and geospatial or geographical location (e.g., geometric area, fleet membership, geopolitical location, temperate zones or regions, global). The MOS data acquired by the data center/sever end 210 and data stored in the FSP database 258 may include operating settings related to: harvester power and traction (e.g., engine idle speed, travel speed, travel direction), header settings (e.g., height, divider spacing, belt speed, deck plate position), feed settings (e.g., feederhouse conveyor speed, reel position/speed), threshing settings (e.g., threshing speed, threshing clearance, cleaning fan speed, chaffer position, sieve position), residual settings (e.g., chopper speed, counter knife position, spreader speed/vane position), and grain flow settings (e.g., clean grain and tailings elevators speed, clean grain auger speed/position). Also, the MPM data acquired by the data center/sever end 210 and data stored in the FSP database 258 may include parameters such as: various yields (e.g., grain yield, biomass yield, lost grain), various quality levels (e.g., clean grain quality, residual quality), post-harvest aspects (e.g., seed/weed promulgation, stubble height), and machine metrics (e.g., harvesting productivity, fuel consumption). Again, the foregoing lists only some examples of the various data points comprising the PF data, the MOS data, and the MPM data employed by the IOSO system 202.

Example Ioso System and Method

The IOSO system 202 disclosed herein allows an operator, remote fleet manager, or other machine control personnel to initialize agricultural harvesters with optimal settings for one or more harvester systems. These optimized settings can be installed during the initial assembly and manufacture of the agricultural harvesters (e.g., programed into the controller 222 of the combine harvester 20) or applied thereto in the field ahead of or at the time that harvesting operations are to begin. This includes delivery of the optimized settings to the agricultural harvesters in the field at periodic intervals, including closely spaced intervals for seemingly continuous optimization, for real-time or near real-time initialization of the operating settings. In some instances the IOSO system 202 may be utilized to provide operating settings optimization during harvesting operations, such that it provides more than setting initialization but also ongoing system setting modification and updating where applicable. This may be advantageous depending on the state of operation of the agricultural harvester, for example, to reinitialize operating settings during idle states of the harvester between one operational state and the next operational state. Moreover, it should be understood that the IOSO system 202 may output the settings optimization in terms of recommendations for consideration by the onboard operator of the agricultural harvester or as control signals to onboard actuators that directly control and adjust operating settings autonomously. When providing operator recommendations to the combine harvester 20, the output of the MSDCA 200 may direct the display device 32 in the operator cabin 28 to display the optimized settings in any suitable textual or graphical format. When the IOSO system 202 autonomously controls aspects of the combine harvester 20, the MSDCA 200 may direct one or more of the actuators 226 to assume operating settings or otherwise perform according thereto directly, without intervention by the operator. In either case, the MSDCA 200 will provide control commands to the agricultural harvester that originate from a controller onboard the agricultural harvester (e.g., via the processor 230 executing control logic resident in the memory 232 of the controller 222 onboard the combine harvester 20) or, when part of a network connected system, are transmitted from a remote location (e.g., via the processor 250 executing control logic resident in the logic database 256 of the data center/server end 210).

With this understanding, and unless specifically addressed otherwise, the following discussion is agnostic to whether the agricultural harvester functions under operator control or autonomously through direct machine automation. Similarly, the discussion generally will be applicable whether the IOSO system 202 provides previously prescribed settings operation for harvester initialization at the factory or preceding harvester operations in the field, or if it provides ongoing (e.g., continuous) settings optimization during harvesting operations. Again, the IOSO system 202 is described below within the context of the MSDCA 200 being implemented in a wireless network system.

With continued reference to FIG. 2, the MSDCA 200 builds and utilizes a computational model 300 in order to effect the IOSO system 202. The computational model 300 includes four broad aspects as follows. The computational model 300 develops evaluation groups 302 of aggregated data sets. The evaluation groups 302 are then abstracted into data constructs 304. The data constructs 304 are scored 306 according to various criteria. Based on the scoring of the data constructs 304, a recommended (e.g., most-suitable to effect the optimized settings) evaluation group 302 is selected and a data set of optimized settings is generated 308.

Figure 3:
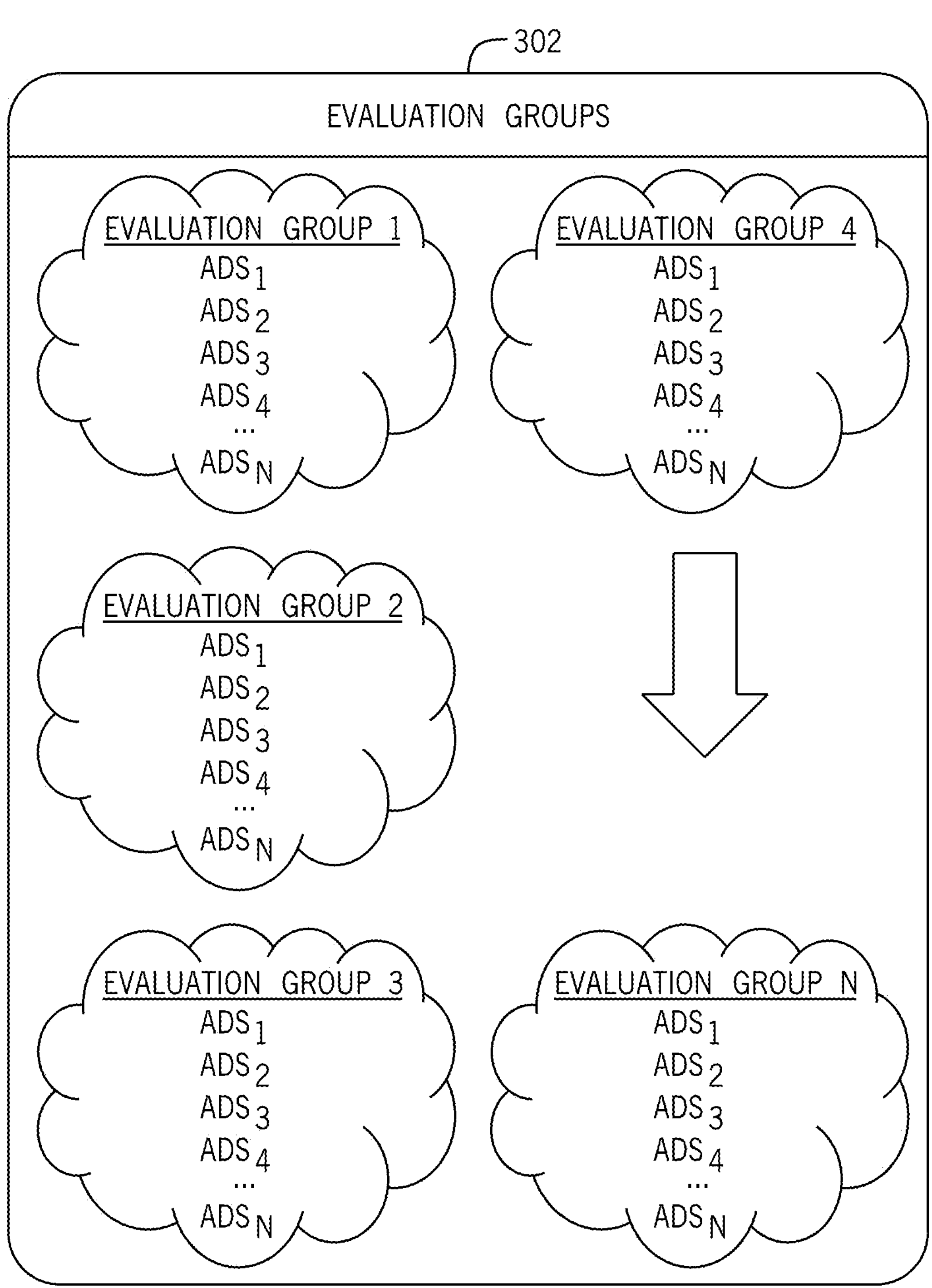
FIG. 3 is a diagrammatic view of an evaluation group aspect of a computational model thereof.

Referring also to FIG. 3, as noted, the IOSO system 202 provides settings optimization based on aggregated data. As utilized herein, "aggregated" data is data compiled over a span of time, across different locations, across different settings or onboard/offboard conditions, or from multiple machines, or a combination thereof. Non-aggregated data, such as a single data point from a particular machine in a particular field, can become aggregated when combined with other aggregated data, since some or all of that data would be from a different time, location, machine, etc.

By way of example, a collection of MOS data from the FSP database 258 for the combine harvester 20 during harvesting operations over a given harvesting season would be considered aggregated data since the data compilation of machine operating settings spans a period of time. The data would be considered aggregated despite being for the same harvester (i.e., combine harvester 20) and field location. The aggregation can be diversified by incorporating MOS data with information for other machine settings. This settings information may be collected from additional harvesters or other machines to further diversify the data set.

Additionally, the aggregation can be diversified by incorporating data with variations in other contexts or by considering other categories of data. For example, the compilation of data could include settings information for the combine harvester 20 performing harvesting operations conducted at different fields (i.e., at different geographical locations) and different crops (i.e., corn and wheat). Further diversification could be achieved by acquiring information pertaining to predictive factors (such as different operators of the combine harvester 20, varied weather conditions, varied soil conditions, and so on) or performance metrics (such as grain yield or fuel consumption).

Three aspects of data aggregation are noteworthy. First, a given data set can be considered aggregated when it contains varied information within the same category of data (e.g., exclusively within the MOS data category). Second, the data set can include, or otherwise be diversified by, information pertaining to other categories of data (e.g., the PF data and/or the MPM data). Third, the diversity of an aggregated data set can be varied and tailored to any degree by including any number or variety of predictive factors, machine settings, and performance metrics. As thus will be understood, data aggregation effectively creates a large (nearly limitless) matrix of possible aggregated data sets.

In this example implementation, the IOSO system 202 manages data aggregation by applying and processing, via the server processor 250 and memory 254, aggregation logic from the logic database 256 at the data center/server end 210. The aggregation logic may include selection criteria instructions for aggregating discrete data sets of like information, such as instructions to aggregate, in a single data set or multiple data sets, data for a given machine: over a prescribed time period, only data for that machine for selected operating settings, only data for that machine at a certain field or geospatial location or locations, only data for that machine under prescribed environmental conditions, all data for a given machine, etc. The aggregation logic may include prioritization criteria instructions, for example, weighting or hierarchal ordering of certain information, such as prioritization of machine configuration data over geospatial data. The aggregation logic may include minimum and maximum membership instructions, for example, so as to exclude data sets with too few data points (e.g., from only a single field or machine) or too many data points (e.g., global machine fleet membership). The aggregation logic may include geospatial boundaries for the aggregated data sets, such as creating aggregated data sets with prescribed geometric boundaries of prescribed shape and area (e.g., squares, rectangles, pentagons, hexagons) or geopolitical boundaries (e.g., town, country, state, country, continent, global). The area of the geospatial grouping can be set in accordance with the rate at which geospatial data is recorded by the applicable processor (e.g., up to 1 Hertz). This may allow a very high geospatial resolution to be used when forming a particular evaluation group including geospatial data. Also, applying an appropriate resolution to other data points (e.g., predictive factors such as weather, soil, satellite imagery (which may be processed according to image processing logic stored in the logic database 256)) may allow relatively smaller geospatial areas to be used, which, when combined with groups from larger geospatial areas but with similar conditions (e.g., predictive factors), may serve to correlate with other data (e.g., indicate typical operator behavior in similar conditions). The resolution of predictive factors such as weather, soil, and satellite imagery allow for groups to be created out of very small geospatial areas that, when combined with groups from larger but with similar qualities areas, may be representative of operator behavior in the given conditions. The aggregation logic may include hierarchical information for the aggregated data sets, such as when certain data points fall within a hierarchal structure (e.g., machine family/class/series/model or crop type/variety).

Further, various of the aggregated data may be curated using the modeling or other logic from the logic database 256. For example, the computational model 300 may receive as inputs geospatial data pertaining to a field or fields deemed to be a targeted field or fields as well as harvest date input. With this, the computational model 300 may then build one or more geometries associated with the target field input, with associated predictive factors (e.g., environment and soil inputs associated with the target field and harvest date). The computational model 300 may then determine anticipated field data associated with the predictive factors (i.e., the environment and soil inputs for the field geometry), which it may incorporate with the machine and crop data for a selected machine and crop combination. Other modeling or other logic may be utilized to curate other aggregated data sets in this or another manner.

Despite the near-limitless possible organizational groupings of aggregated data sets, it is envisioned that a prescribed quantity will predominately influence the outcome of the IOSO system 202. It is likely that a finite number of evaluation groups, such as 30-100 unique evaluation groups, may be utilized, or required, to achieve optimized settings using the IOSO system 202. Although numerous possibilities exist, the evaluation groups may be implemented according to certain prescribed guidelines. For example, in the example implementation shown in FIG. 3, each evaluation group 302 consists of multiple aggregated data sets, in which each grouping of aggregated data sets is selected from the array of aggregated data sets $ADS_1$-$ADS_N$ to be unique from the groupings of the rest of the evaluation groups 302. As such, the IOSO system establishes a unique set of evaluation groups $EG_1$-$EG_N$. Each of the aggregated data $ADS_1$-$ADS_N$ sets may include a single factor, setting, or parameter, or may be include multiple combinations thereof, at any particular granularity, resolution, or geospatial boundary. The aggregated data $ADS_1$-$ADS_N$ sets may include zero, one, or multiple aggregated data sets in common provided none of the evaluation groups $EG_1$-$EG_N$ will be identical to another.

Figure 3A:
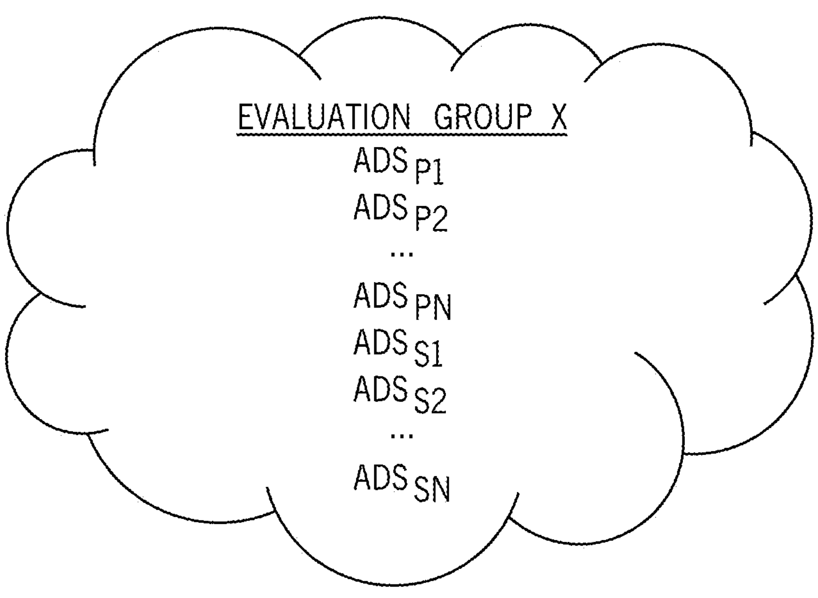
FIGS. 3A and 3B depict constituents of example evaluation groups.
Figure 3B:
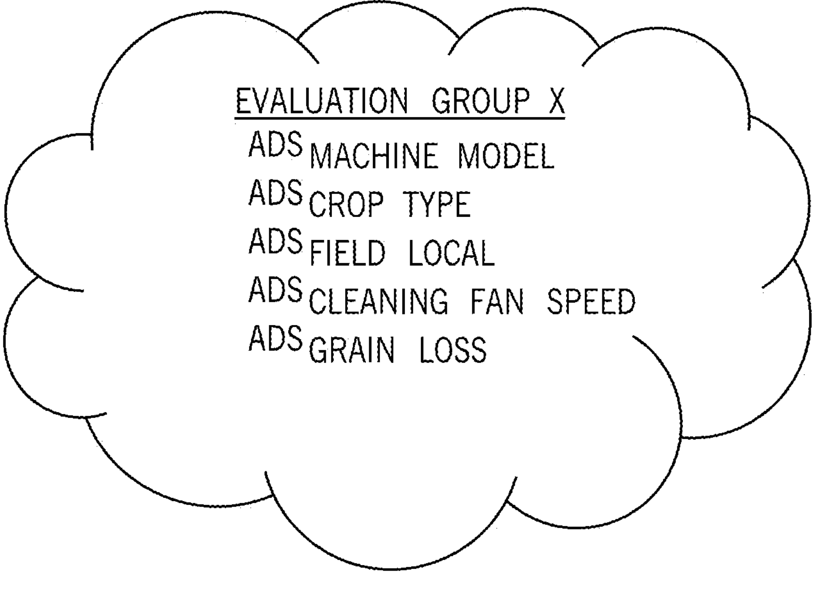

The aggregation logic and the logic pertaining to the evaluation group 302 of the computational model 300 may also specify that all of the evaluation groups $EG_1$-$EG_N$, or a prescribed percentage (less than 100%), may share one or more high-priority or primary sets of the aggregated data sets $ADS_{P1}$-$ADS_{PN}$, as indicated in FIG. 3A. The remainder of the aggregated data sets $ADS_{S1}$-$ADS_{SN}$ may then be considered supplemental (e.g., secondary, tertiary, etc.). For example, empirical study indicates that machine and crop parameters may be highly correlative, or at least together correlate more highly that either parameter alone or when combined with other parameters) to settings optimization. As such, the evaluation groups $EG_1$-$EG_N$ may all include an aggregated data set for a machine-specific parameter and a crop-specific parameter. By way of example, as shown in FIG. 3B, one such evaluation group $EG_X$ may include the following aggregated data sets: $ADS_{MACHINE\ MODEL}$, $ADS_{CROP\ TYPE}$, $ADS_{FIELD\ LOCAL}$, $ADS_{CLEANING\ FAN\ SPEED}$, $ADS_{GRAIN\ LOSS}$. Thus, the evaluation group $EG_X$ is defined by two primary aggregated data sets (i.e., $ADS_{MACHINE\ MODEL}$, $ADS_{CROP\ TYPE}$) and three supplemental aggregated data sets (i.e., $ADS_{FIELD\ LOCAL}$, $ADS_{CLEANING\ FAN\ SPEED}$, $ADS_{GRAIN\ LOSS}$). This example evaluation group thus has a high diversity value, including predictive factors, machine settings, and performance metrics in one. The aggregation logic and the evaluation group 302 of the computational model 300 may specify various other guidelines and criteria for the establishment of the aggregated data sets themselves and their collection and disbursement within and across the various evaluation groups employed by the IOSO system 202.

Figure 4:
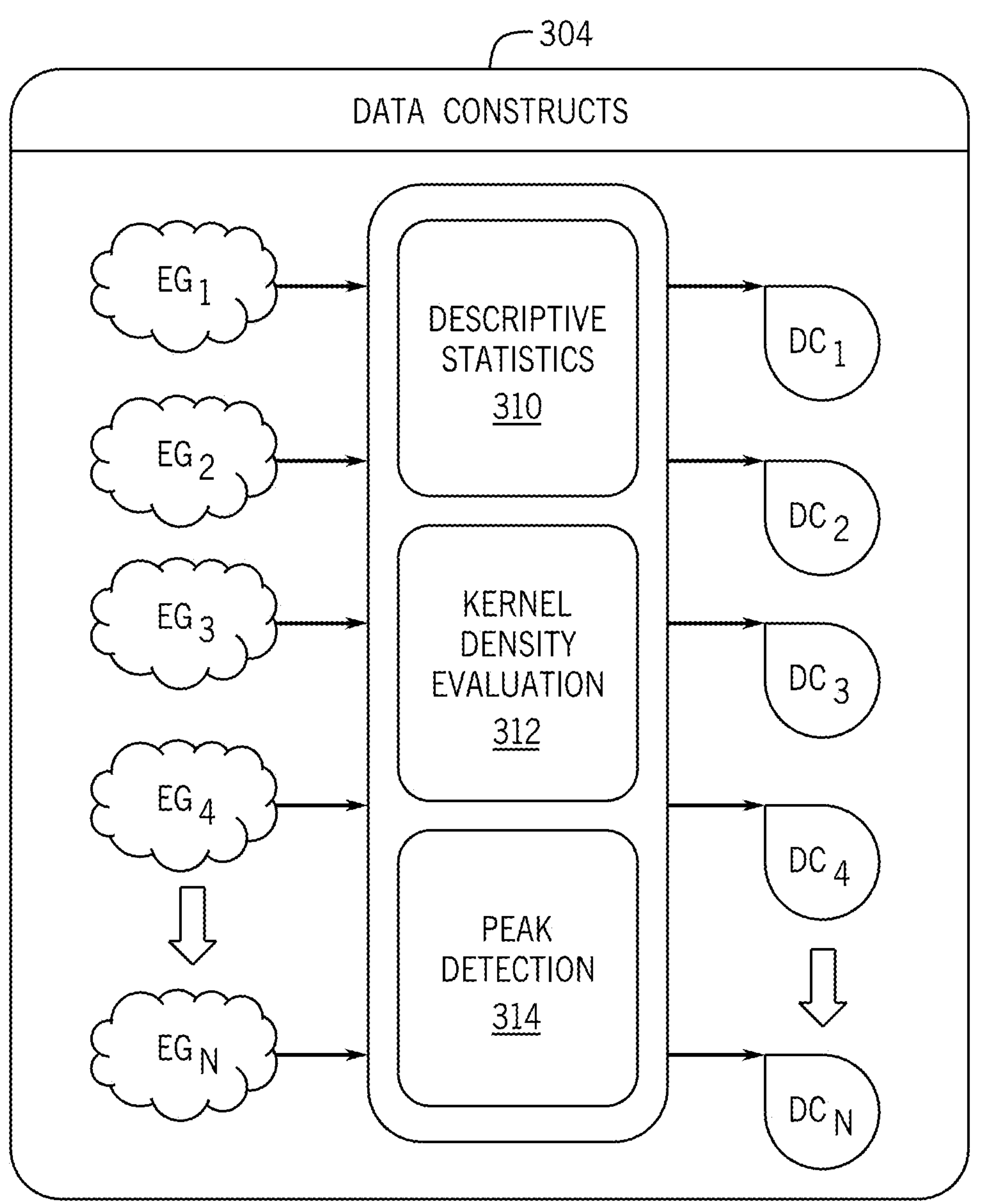
FIG. 4 is a diagrammatic view of a data construct aspect of the computational model.

Referring now also to FIG. 4, the MSDCA 200 of the IOSO system 202 executes the modeling logic stored in the logic database 256 to further build or update the computational model 300 by abstracting the developed evaluation groups 302 into data constructs 304. The data constructs 304 aspect of the computational model 300 serves, at least in part, to provide a computationally amenable and efficient mechanism to process the numerous possible evaluation groups 302 as well as to address the fact that each harvesting operation may include aspects that form parts, or are members, of aggregated data sets of multiple evaluation groups 302 developed by the computational model 300, as detailed above. As such, the computational model 300 assesses the merits of the evaluation groups $EG_1$-$EG_N$ to determine which is best suited to provide optimized settings data for the combine harvester 20 when harvesting a particular crop at a particular location.

The data constructions 304 aspect of the computational model 300, and indeed the entire computational model 300 itself, may be developed, in whole or in part, from logic using proprietary source code or open source code. For example, various open source platforms based on the Python programming language may be utilized to derive some or all of the statical analysis needed to abstract the aggregated data of the evaluation groups 302 into the data constructs 304 for downstream processing by the MSDCA 200. One such platform is SciPy, which is an open-source library of Python for technical computing built on the NumPy extension of Python. Any one or more of various known statistical analyses available through SciPy or other platforms may be useful to abstract data constructs of the evaluation groups 302 beyond those described herein. In the example implementation, the computational model 300 may utilize three types or categories of statistical analyses to analyze the samples of aggregated data sets of which the evaluation groups are comprised. In this case, these include descriptive statistics 310, density estimation 312, and peak detection 314. The computational model 300 applies these analyses to transform the evaluation groups $EG_1$-$EG_N$ to corresponding data constructs $DC_1$-$DC_N$.

Descriptive statistics refers to the branch of the statistic discipline directed to summarizing sample data quantitatively, as opposed to deducing the sample's population inferentially. Descriptive statics includes such well-known concepts and techniques as mean, median, mode, variance, standard deviation, range, and quantiles (see, e.g., vertical quantile lines $q_1$-$q_4$ in FIG. 4, described below), which will not be detailed herein. The computational model 300 applies one or more of these descriptive statistics techniques 310 to the aggregated data sets comprising each of the evaluation groups 302 as a preliminary step to quantifying the distribution of the aggregated data.

The computational model 300 then seeks to estimate a probability density function of a given variable or factor from the aggregated data sets comprising the evaluation groups 302. This may be carried out with histograms; however, a more efficient and useful tool is kernel density estimation ("KDE") 312, of which the kernels provide continuity and smoothness attributes that the intervals of histograms cannot. As is understood in the art, the bandwidth parameter is highly influential on the resulting estimate, either causing under- or over-smoothing of the sample distribution. Various known bandwidth approximations and estimators (e.g., normal distribution and Gaussian approximations and Scott's and Silverman's rules of thumb) may be utilized to achieve a bandwidth that provides appropriate smoothing for a given data set. Applying these devices, and/or empirical tuning of the KDE, serves to provide an optimal tradeoff between bias and variance in the data.

The computational model 300 then utilizes the KDE 312 to detect prominent peaks 314 resulting in the density function estimation. Generally, the preferred estimates may be unimodal, or define single peaks, which signify a primary locus of data points. Estimation distributions with no peaks are generally avoided, or may suggest that the modeling logic needs adjustment, since such estimation distributions generally render it difficult to select a focal point for the data. Multimodal, or multi-peak, estimation distributions are better than zero-peak distributions, but likely less preferable to unimodal distributions. That said, in some cases, multiple prominent peaks may provide useful information. If the peaks are of sufficiently low quantity (e.g., 2 or 3) and sufficiently pronounced (e.g., varied by 30 percent or more from adjacent parts of the distribution), it is potentially the case that the sampled data represents more than one set of conditions that drive different PF, MOS, MPM data values. For example, this may be seen in groups that represent large geospatial areas, since there may be factors (e.g., predictive factors such as weather, climate, etc.) that impact settings or performance measures differently. This too may indicate that the modeling logic (e.g., evaluation group selection) may benefit from being altered. As with KDE, peak detection is highly tunable and may best be tuned with respect to the smoothing done during KDE tuning 312.

Figure 4A:
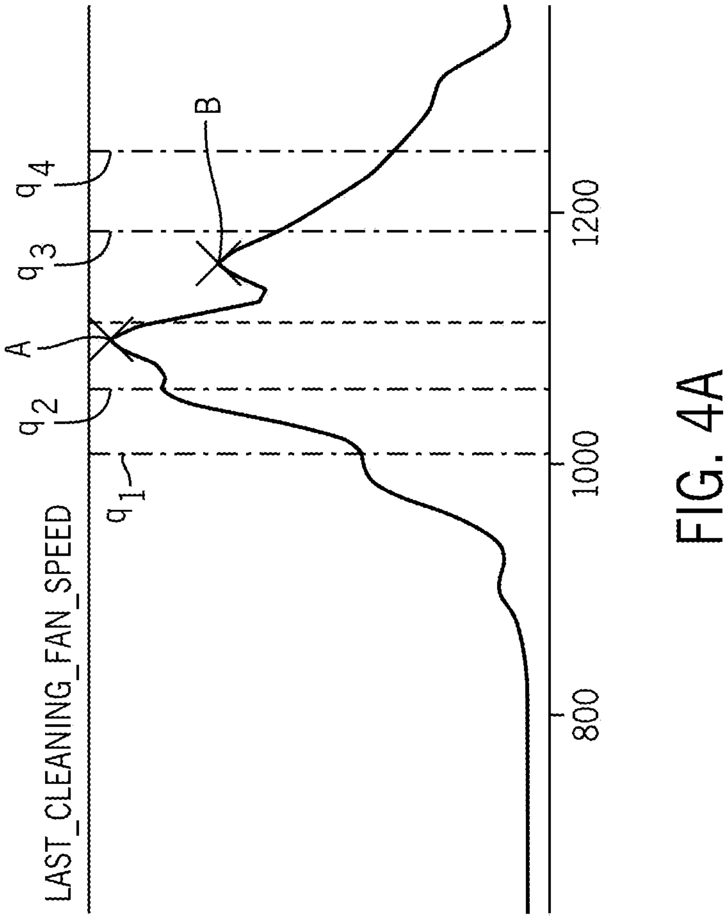
FIG. 4A is a plot of an example data construct of an example evaluation group for an example settings parameter of the combine harvester.

FIG. 4A provides an example data construct in the form of a density function estimation for an evaluation group having an aggregated data set for the speed of the cleaning fan 50, which may be for the combine harvester 20 over a period of time or locations, for the additional harvesters or other work machines 214, or both. The KDE tuning 312 provides an estimation distribution in which two prominent peaks are identified at points A and B in FIG. 4A, although other lesser peaks are also identifiable. A data construct such as shown in FIG. 4A would likely indicate that an optimal cleaning fan speed would be slightly less than 1,100 RPM for whatever machine and crop combination that the aggregated data set pertains. This same data construct may also provide for nominal minimum/maximum bounded settings around point A (e.g., such as about 1,050-1,175 RPM, that is, between the inner two quantile lines $q_2$ and $q_3$). Depending on what other information is known about the aggregated data set, this data construct may be used to provide other settings optimization, or otherwise to improve the modeling logic. As one example, if it was known that the aggregated data set encompassed a wide geospatial region that was large enough to encompass both moist climates and arid climates (e.g., the entire western United States), the distinct twin peaks at points A and B may indicate that optimal settings for two distinct PF data points, one pertaining to the moist climate and the other pertaining to the arid climate.

Figure 5:
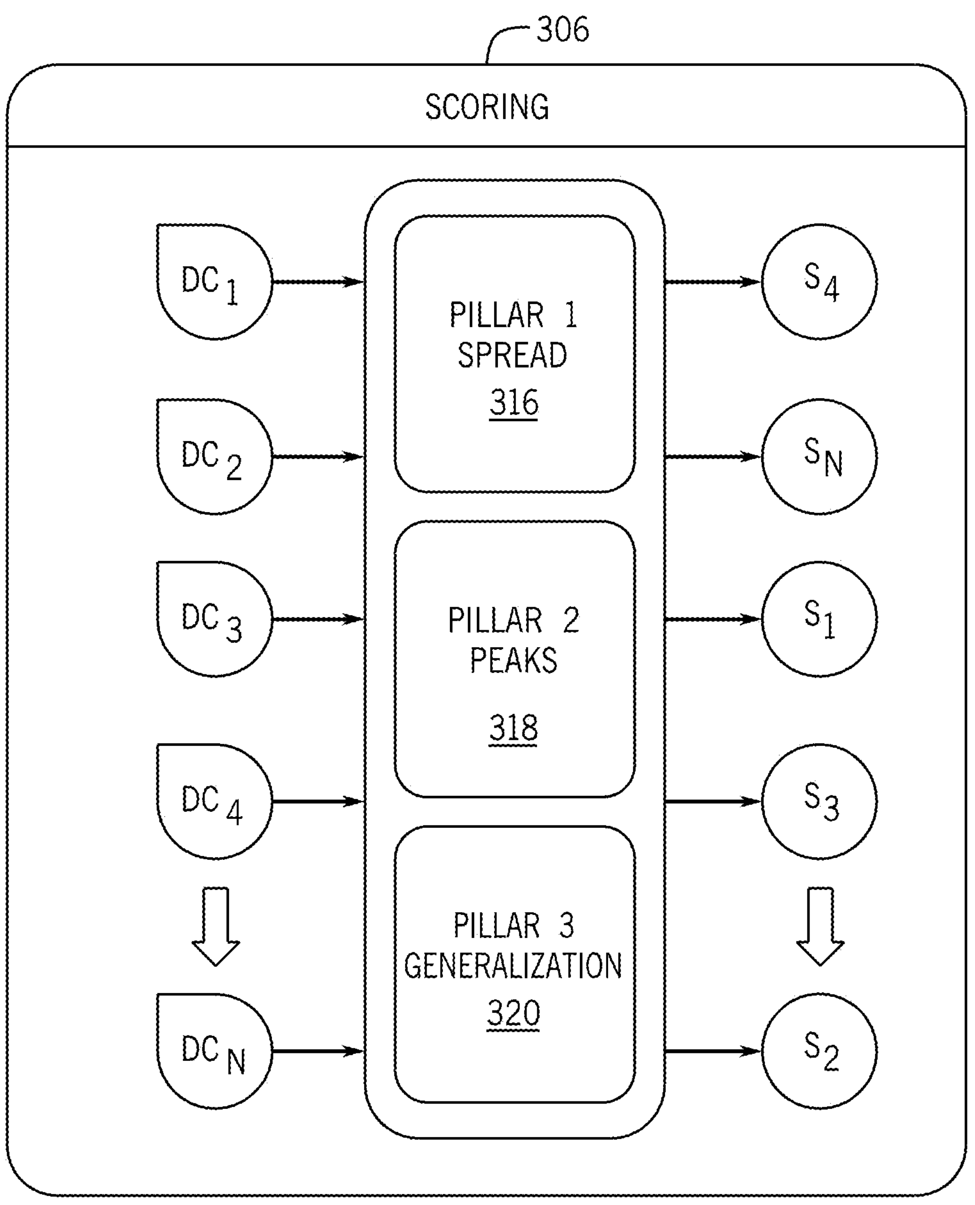
FIG. 5 is a diagrammatic view of an scoring aspect of the computational model.

Referring now also to FIG. 5, the computational model 300 applies a suitability or selection score to the abstracted data constructs 304 corresponding to each of the evaluation groups 302. Any of various weighting or prioritization schemes may be employed at this phase of the computational model 300 to aid in selection of the evaluation group that provides the most optimized settings for a given machine and crop combination at a given field. In the described implementation, the MDSCA 200 processes the modeling logic stored in the logic database 256 according to certain scoring pillars that are weighted according to their significance for different harvesting operations and machine and crop combinations. In this example, the modeling logic applies the three scoring pillars of spread 316, peaks 318, and generalization 320. Each of these three example scoring pillars 316, 318, 320 will now be described.

The spread scoring pillar 316 is directed to the statistical concept of variance. One such example of variance is quantile based coefficient of variance ("QCV"). The goal of the spread scoring pillar 316 is to elevate data constructs 304 (and thereby their representations of the distributions of aggregated data sets making up the evaluation groups 302) that have at least some minimum level of variance (or spread), while penalizing distributions that are over a maximum level of variance (i.e., are overly broad). Having some amount of variance facilitates setting optimization for machines that make use of the IOSO system 202. This is particularly so for machine automation systems which may benefit from an optimized settings band in order to resolve settings conflicts or attain target metrics required by other control logic of the machine.

FIG. 5A provides an example plot of the spread scoring pillar 316 for a QCV in which the most optimal (or highest) scoring is zero "0" on the vertical axis and the amount of variance is reflected by the horizontal axis. As can be seen, the least optimal (or lowest) score occurs at zero variance (i.e., the highest point on the curve). The score improves from there rapidly as the curve descends downwardly until it reaches the horizontal axis, which represents the variance corresponding to the most optimal score. From that point on, the curve gradually ascends toward less optimal scores as the variance increases beyond optimal.

The peak scoring pillar 318 relates to the same or similar concept as the peak detection described above with regard to the data constructs 304 aspect of the computational model 300. Here the computational model 300 seeks to elevate unimodal or single-peak distributions, while penalizing distributions with zero identifiable peaks or, to a lesser extent, multimodal distributions with multiple identifiable peaks (i.e., up to a maximum quantity of prominent peaks). More specifically, distributions with zero peaks are heavily penalized to avoid distributions that are too broad to provide any confidence in the suggestion of a particular optimized setting. Distributions with multiple prominent peaks are also penalized but to a lesser extent, since multiple prominent peaks may identify optimal settings bands or settings where multiple disparate factors have significant influence. Generally, however, the more peaks, the more the distribution is penalized by the peak scoring pillar 318.

FIG. 5B provides an example plot for the number of prominent peaks in which the most optimal (or highest) scoring is zero "0" on the vertical axis and the number of peaks is reflected along the horizontal axis. In this example, the least optimal (or lowest) score occurs at zero peaks (i.e., the highest point on the curve). The score improves rapidly as the curve descends linearly downwardly until it reaches the horizontal axis, which represents the peaks corresponding to the most optimal score, namely, one "1" peak (i.e., a unimodal distribution). From that point on, the plate follows an asymptotic curve ascending, initially rapidly and then tapering, toward less optimal scores as the number of peaks increase beyond optimal.

The generalization scoring pillar 320 seeks to elevate data constructs 304 (and thereby evaluation groups) with higher membership (i.e., data points making up the aggregated data sets). This scoring pillar promotes data constructs 304 that are abstracted from aggregated data sets that have multiple distinct modalities, such as multiple organizations (e.g., machines, fleets, etc.) as well as those with increased overall data points, such as higher total operating hours. At the same time, the generalization scoring pillar 320 seeks to restrain the significance of membership by penalizing distributions reflective of aggregations that are too extensive. In this way, the generalization scoring pillar 320 works to prevent global-sized distributions from always being scored the highest. Thus, the generalization scoring pillar elevates data constructs of evaluation groups containing aggregated data sets that have a membership above a minimum membership value and less than a maximum membership value.

FIG. 5C provides an example plot for the number of unique organizations in which the most optimal (or highest) scoring is zero "0" on the vertical axis and the number of organizations are reflected along the horizontal axis. In this example, the least optimal (or lowest) score occurs at about one (i.e., the highest point on the curve). The score follows a decaying curve and improves very rapidly as the curve descends downwardly. In this case, the curve does not reach the horizontal axis (i.e., the most optimal score). Instead, the curve tapers at an ever slowing rate toward the horizontal axis. The modeling logic may then provide a cut-off threshold, such as for the rate of change or other variable, at which point a score is assigned for the number of organizations corresponding to the most optimal.

The computational model 300 processes the data constructs 304 and scoring pillars 316, 318, 320 in the manner described above to assign scores. The computational model will resolve scores $S_1$-$S_N$ to be assigned to the data constructs $DC_1$-$DC_N$. In the described example, the data constructs $DC_1$-$DC_N$. been assigned scores $S_1$-$S_N$, as shown in FIG. 5, and summarized below.

| Data Constructs | Scoring Pillars |
|---|---|
| $DC_1$ | $S_4$ |
| $DC_2$ | $S_N$ |
| $DC_3$ | $S_1$ |
| $DC_4$ | $S_3$ |
| $DC_N$ | $S_2$ |

Figure 6:
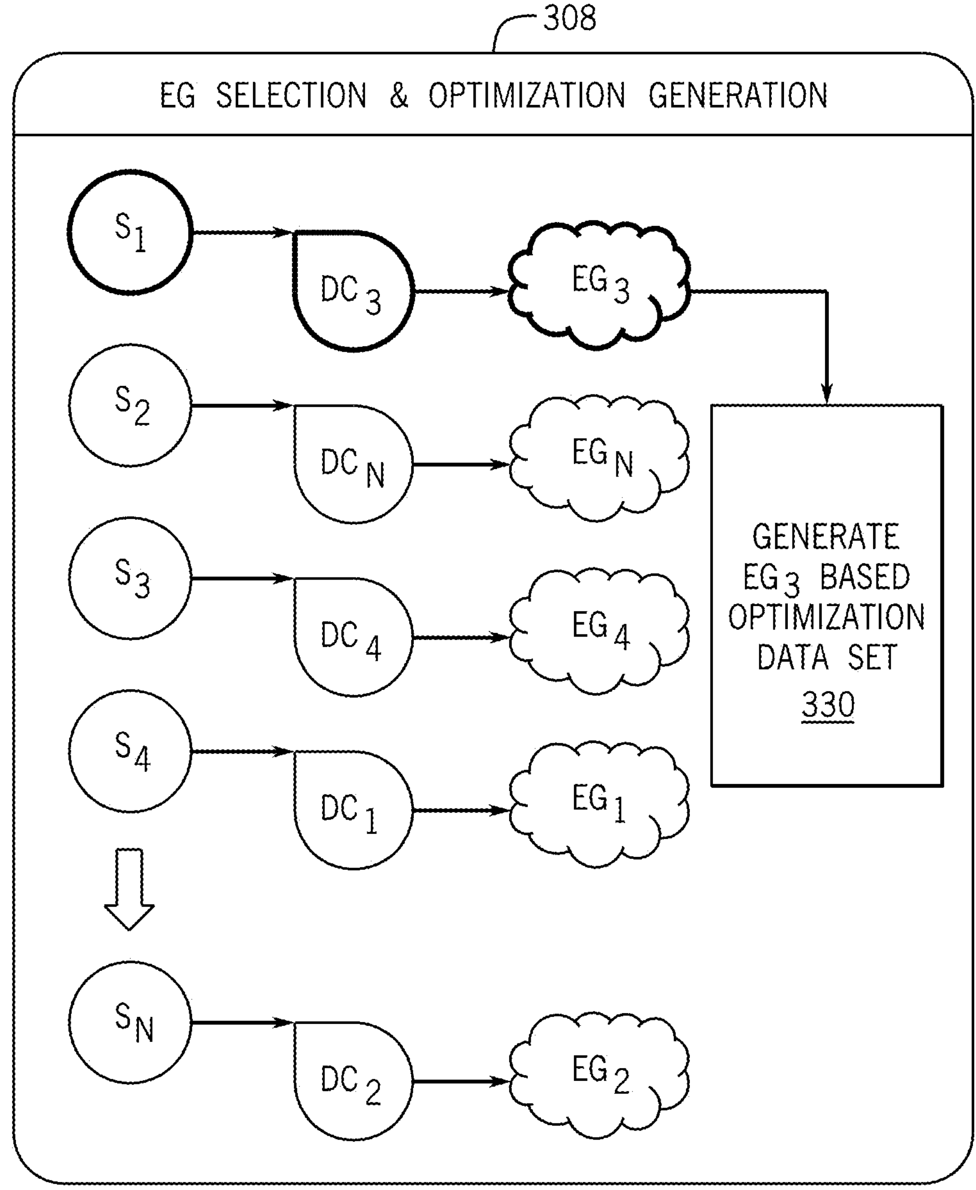
FIG. 6 is a diagrammatic view of an evaluation group selection and optimization database generation aspect of the computational model.

The computational model 300 then proceeds to the selection of the evaluation groups 308. Here, the data constructs 304 may be ranked according to the scoring 306, assigned as described above, and the data constructs 304 are associated with their corresponding evaluation groups 302, such that the evaluation groups 302 are ranked as well. In the described example, the scores $S_1$-$S_N$ are assigned to the data constructs $DC_1$-$DC_N$ and their associated evaluation groups $EG_1$-$EG_N$, and may be reordered based on score (e.g., the data construct/evaluation group with the highest score at the top), as shown in FIG. 6 and summarized below.

| Scoring Pillars | Data Constructs | Evaluation Groups |
|---|---|---|
| $S_1$ | $DC_3$ | $EG_3$ |
| $S_2$ | $DC_N$ | $EG_N$ |
| $S_3$ | $DC_4$ | $EG_4$ |
| $S_4$ | $DC_1$ | $EG_1$ |
| $S_N$ | $DC_2$ | $EG_2$ |

Thus, as can be seen, the computational model 300 has resolved that the evaluation group $EG_3$ provides the most optimal settings for a given machine and crop combination. Evaluation group $EG_3$ is followed sequentially by $EG_N$, $EG_4$, $EG_1$, and $EG_2$ as evaluation groups providing less optimal settings. Thus, the computational model 300 will select the evaluation group $EG_3$ and output the operating settings associated therewith.

Once the winning evaluation group has been selected, the computation model 300 then resolves a set of optimization data for use by downstream systems (i.e., the various systems of the agricultural harvester(s) to which the settings apply). The computational model 300 may output a variety of information associated with the selected evaluation group. Various non-limiting examples include the following. The computational model 300 may output a set of optimized operating settings in which one setting is provided for each system or operation being set. Additionally, or alternatively, the set of optimized operating settings could be provided in terms of various bands of settings, such as various minimums and maximum settings values (e.g., absolute, nominal, feasible, optimal minimum/maximum limits). In addition to, or instead of, a set of optimized settings values, the computational model 300 may provide various of the statistical metrics utilized or derived by the model resolving the selected evaluation group. These could include such values as the mean, median, quantiles, standard deviation, and KDE values of the selected distribution. The computational model may also output values pertaining to the spread, prominent peaks, and generalization of the selected distribution. Such additional information and the settings bands may aid in the MSDCA 200 optimizing settings by providing valid settings value ranges for certain systems are under control of other logic or algorithms that benefit from or require valid flexibility or search space to implement operating settings. Thus, in the desired format, the MSDCA 200 will execute the computational model 300 to generate an optimized data set 330.

The following table represents one example of the optimized data set 330 output by the computational model 300. In this example, the information is output as a data table and in terms of a single optimal setting for each targeted system or component to be initialized. The data table represents a particular machine and crop combination (e.g., MC1), and the settings are organized by the system to which they pertain when the machine and crop combination MC1 is to be utilized in harvesting operations at various locations (e.g., $Field_1$-$Field_N$).

| Machine & Crop Combination: MC1 | | | | | |
|---|---|---|---|---|---|
| Settings | Cleaning Fan Speed | Thresher Speed | Thresher Clearance | Chaffer Position | Sieve Position |
| $Field_1$ | 800 | 600 | 10 | 6 | 10 |
| $Field_2$ | 900 | 490 | 5 | 8 | 12 |
| $Field_3$ | 1000 | 800 | 12 | 10 | 5 |
| $Field_4$ | 750 | 550 | 8 | 7 | 8 |

A data table such as this can be created for each machine and crop combination for any setting or group of settings to be optimized. Of course, the data tables could be arranged and organized in numerous other ways.

Although not shown in the figures, it will be understood that computational model 300 may perform multiple iterations of the operations of 302-308 to achieve a single selected evaluation group. It may also perform multiple iterations to achieve multiple selected evaluation groups, such as when the settings to be optimized by the IOSO system 202 require the assessment of aggregated data that is beyond that of any single evaluation group. In such cases, the computational model 300 may select multiple evaluation groups from which to derive the optimized settings, or it may create a new or augmented (i.e., combined) evaluation group that includes all aggregated data sets needed to optimize the targeted settings.

As noted above, the IOSO system 202 may provide operating optimization by directing the optimized settings data to be displayed as recommendations for the operator (e.g., on the display device 32 of the combine harvester 20) or to a personnel at the data center/server end 210. This, too, may be implemented in numerous ways, including various textual, graphical, or both, user interface displays. The IOSO system 202 may also serve to autonomously control the agricultural harvesters by providing optimized settings to the machine controllers for automated processing. The data tables, in the desired format, could then be output to agricultural harvesters (e.g., combine harvester 20) for processing by the onboard controllers (e.g., controller 222) to initialize the various settings accordingly. It may also be possible for the data center/server end 210 to execute the initialization process (e.g., using processor 230) over the network 212. In that case, the onboard controllers or the MSDCA 200 could include machine state and aggression logic to direct the implementation of the settings automation. Such logic could, for example, specify during which machine states (e.g., engine off or idle) that the settings optimization routines may be performed as well as to what degree the automatic implementation of the optimized settings will be enforced on a given agricultural harvester or harvester system. In various implementations, the IOSO system 202 may cause various maps to be presented to the harvester operator or data center personnel. It will be understood that the map data may serve to inform the harvester operator and/or data center personnel as well as provide data for automated machine control.

Figure 7:
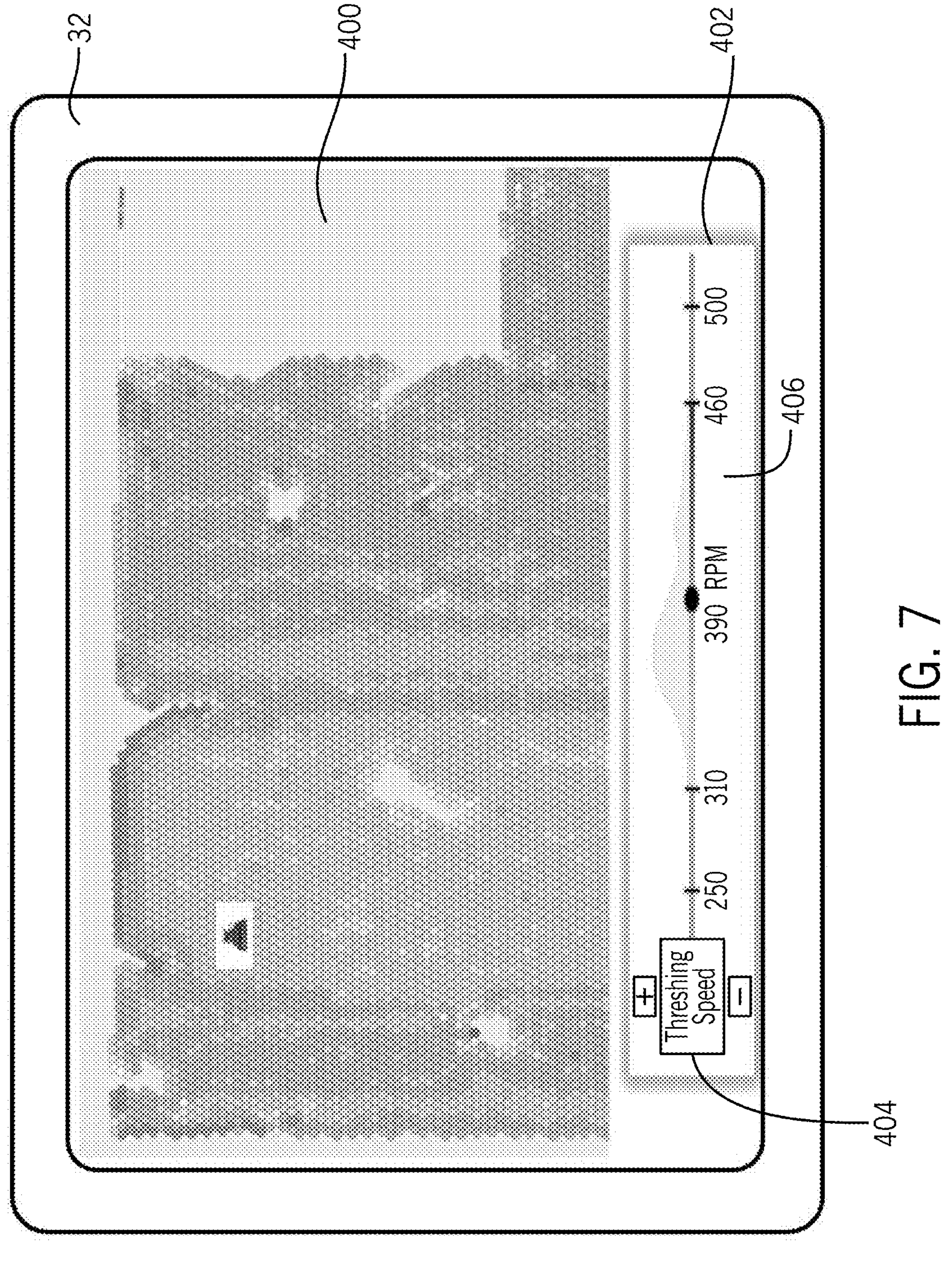
FIGS. 7 and 8 are example operator displays for the combine harvester of FIG. 1 showing settings maps containing optimization settings data sets.

By way of example, FIG. 7 shows an example of the IOSO system 202 outputting the optimized settings data to an operator in the operator cabin 28 of the combine harvester 20 by generating a settings map 400 and a settings text/graphic field 402 on the display device 32. As noted, a similar combination map and text/graphic field interface can be generated at one or more displays at the data center/server end 210. Since the computational model 300 can provide optimization at any geospatial resolution, such settings maps 400 covering any geographic region with optimized settings provided for any resolution (e.g., a geometric boundary of a given area and shape) within the mapped region. The operator may, for example, use the operator interface 30 to select an area of the settings map 400, including the area corresponding to the current location of the combine harvester 20. In so doing, the display device 32 may be controlled (e.g., via the onboard controller 222) to populate the settings text/graphicfield 402 with optimized settings corresponding to the selected region of the settings map 400. While various arrangements and configurations are possible, in the illustrated example the settings text/graphic field 402 may include Settings ID Box 404 with up and down scrolling graphical inputs above and below it to allow the operator to change the selected setting for which the Optimization Data Panel displays the optimized settings data output from the IOSO system 202. In the depicted example, the Settings ID Box 404 is set to "Threshing Speed" and the Optimization Data Panel 406 illustrates a horizontal speed axis with RPM values, a probability function curve (e.g., corresponding to the KDE estimation derived by the computational model 300), and an enlarged indicator "bullet" for the nominal optimized setting for the speed of the thresher 42, in this case 390 RPM. Of course, other data (e.g., current value or setting minimum/maximum bands) or text/graphic representations may be utilized.

Again, beyond displaying recommendations to the operator, the optimized settings represented by the settings map 400 and/or text/graphic field 402 may be passed to downstream automation systems to allow for automated machine control (i.e., effecting the setting adjustment autonomously without operator input). Also, with the settings map 400, at any point in the field, the combine harvester 20 (or the data center/server end 210) may confirm whether the corresponding system(s) are within the optimized setting and, if not, either readjust to the optimized setting or override it in response to other machine control logic.

Figure 8:
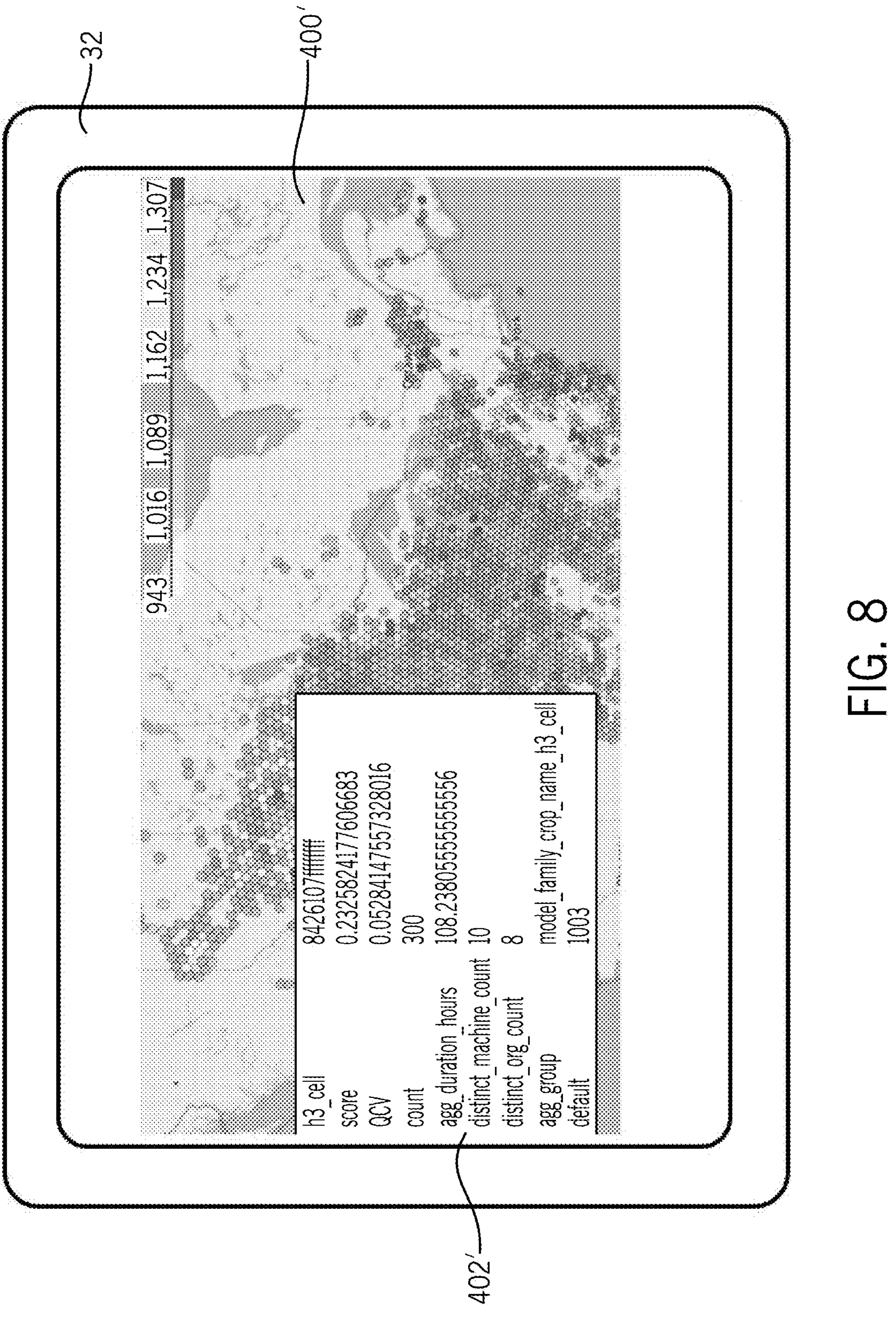

FIG. 8 provides another example user interface for display to an operator onboard the combine harvester 20 (via display device 32) or to personnel at the data center/server end 210. This example user interface includes another settings map 400' and a settings text/graphic field 402'. Here, the map may be displayed at a courser resolution than that in the example shown in FIG. 7 and may be used for onboard reference purposes to display the optimized settings for every machine and crop combination over the entire geographical region of the settings map 400'. The details of the optimized distributions may be used to select the default and/or minimum/maximum (e.g., nominal and feasible) value(s) for each setting. Those values (and their reference keys) may be written to a data table (e.g., the FSP database 258) and transferred to the combine harvester 20 and/or the additional harvesters or other work machines 214 (e.g., those part of the same fleet, organization, or geographical region).

Moreover, the optimized settings derived by the IOSO system 202 may be delivered, in the aforementioned data tables or user interface formats, or any other suitable format, to the agricultural harvesters at various different times and manners. These generally include the delivery categories of: (a) onboard ahead of time, (b) offboard ahead of time, and (c) offboard in real time. Onboard ahead of time delivery may include installation of applicable components of the IOSO system 202 to the agricultural harvesters at the time of manufacture and assembly by the OEM or by after-market suppliers at some point subsequent to the in-service date of the machine. For example, this may include installing the logic and FSP databases 256, 258 (or applicable portions thereof) into the memory 232 for execution by the processor 230 of the onboard controller 222 of the combine harvester 20. The data written in the onboard memory 232 may also be tailored by geospatial resolution (e.g., limited to the applicable fields or geographical regions in which the harvester will be used) for the efficient utilization of onboard memory 232. Although, the higher geospatial resolution, and the greater amount of the stored aggregated data that may be installed, will likely result in better initial setting optimization and continuity of optimization updating, during times without connectivity to the network 212. With connectivity to the network 212, the IOSO system 202 can be implemented as described above. Further, with real-time delivery of the optimized settings, the IOSO system 202 would be able to collect additional information about ongoing predictive factors, machine operating settings, and machine performance metrics in order to more effectively optimize settings based on the aggregated data representative of similar machine and crop combinations at geographical locations with similar conditions. The optimized settings could be delivered and effectuated at various temporal resolutions (e.g., before, during, or after harvesting operations), at specific operating states of the machine (e.g., engine off or idle), due to sensed changes in predictive factors (e.g., changing weather conditions), or any other suitable time periods.

Figure 9:
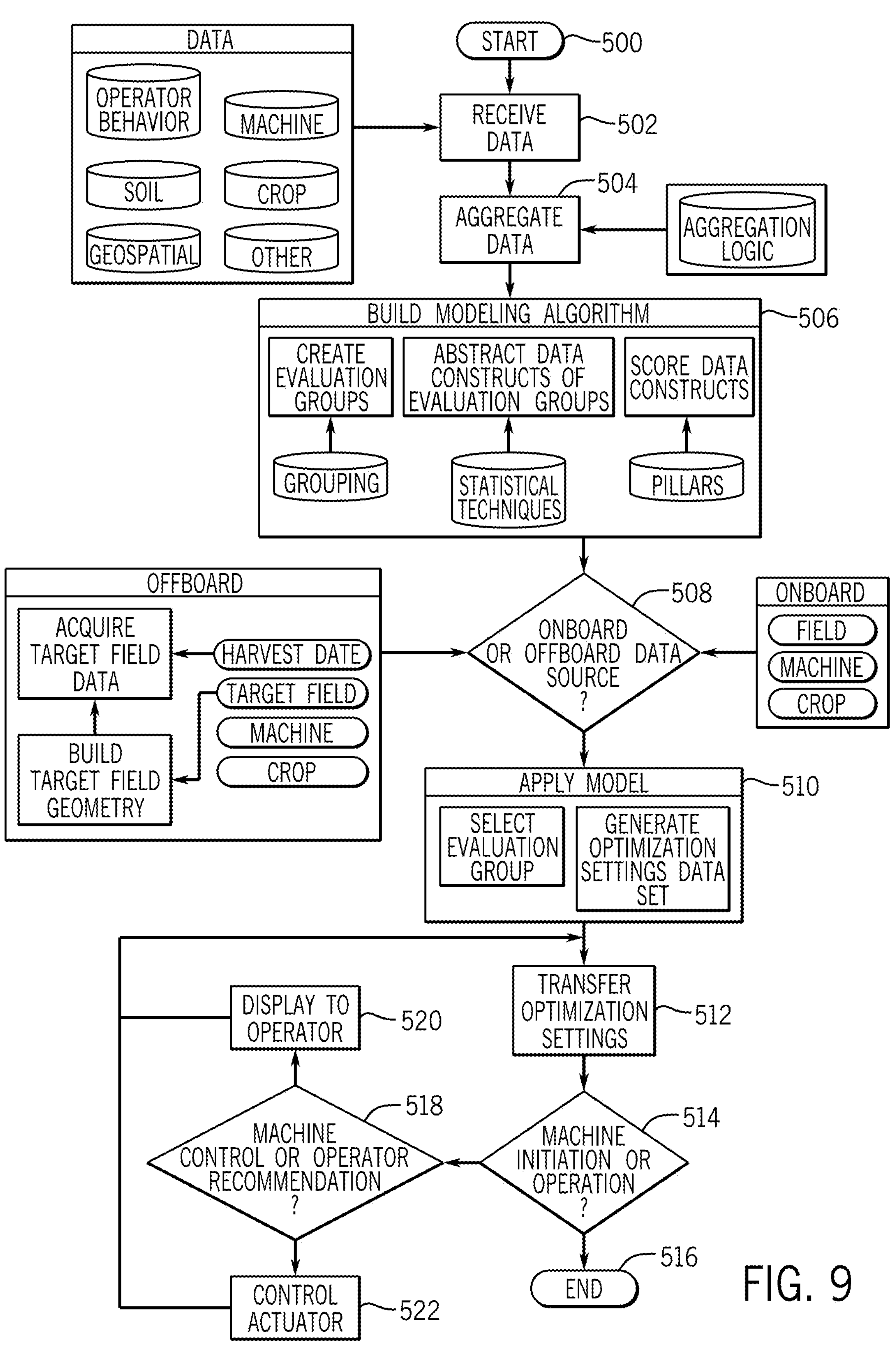
FIG. 9 is a process flow diagram for an example settings optimization method.

Referring to FIG. 9, an example method or process of implementing the IOSO system 202, beginning at step 500, will now be described. At step 502, the MSDCA 200 of the IOSO system 202 may receive raw data from the various data sources discussed above (and others), including data pertaining to historical operator behavior, machine type and characteristics, crop type and characteristics, soil type and characteristics, geospatial location, and various other factors (e.g., environmental factors such as weather and imaging data such as from satellites and drones). At step 504, the IOSO system 202 will aggregate the data collected from the various data sources in any of various manners, including, for example, by simply combining like kind information together or in accordance with other aggregation logic that may group the data according to more complex organizational paradigms (e.g., hierarchies, prioritization schemes, factor groupings, etc.). The aggregated data sets are compiled and stored in data stores such as the FSP database 258.

At step 506, the IOSO system 202 builds a modeling algorithm (e.g., computational model 300) using the MSDCA 200 to process modeling logic such as that stored in the logic database 256. The modeling logic includes the chief aspects of the IOSO system 202 described above, to wit, the creation of evaluation groups 302 by applying aggregation and grouping logic, the abstraction of the evaluation groups into data constructs 304 using statistical techniques (e.g., KDE 312 and peak detection 314), and the scoring of the data constructs 306 according to scoring pillars (e.g., spread 316, peaks 318, generalization 320).

At step 508, the method will acquire data inputs and query whether the inputs are local inputs from onboard the harvester (e.g., onboard sensors 224) or remote inputs from offboard the harvester (e.g., offboard sensors 238). The local or onboard inputs may include various information pertaining to the field (e.g., location, environment, soil, etc.) in which the harvester is operating, the harvester itself (e.g., machine type/characteristics, operating conditions, and operating settings), and the crop being harvested (e.g., crop type/variety, crop condition). This information may be acquired and processed by the MSDCA 200 in the manner described above.

The offboard inputs may also include a similar array of machine, crop, and field information and be processed by the MSDCA 200 in a similar manner. The method may also process modeling logic to construct a prospective field for harvesting about which the modeling logic will be applied. The method may receive a target field input and a harvest date input and build an associated field geometry. With the target field constructed according to this field geometry, the method may acquire environment and soil inputs (e.g., atmospheric and ground conditions) associated with the target field for the anticipated date on which the harvesting operation is to be performed. The method may then resolve anticipated field data associated with the environment and soil inputs for the field geometry. The method may then incorporate the anticipated field data with the machine and crop inputs.

At step 510, the method applies the model to select the evaluation group that is most suitable to optimize the settings of the harvester for the given harvesting operation. The method may make this selection subsequent to the anticipated target field routine mentioned in step 508 to identify the machine and crop combination that may be most suitable to perform the expected harvesting operation. The selection results from the application of grouping, abstracting, and scoring aspects of the model being applied to the aggregated data sets in the above-described manner. Once selected, the IOSO system 202 generates the optimized operating settings.

At step 512, the optimized operating settings are transferred to the harvester as various data tables, maps, operator interface (GUI) commands, or machine automation control instruction sets. It will be appreciated that various components and amounts of the aggregated data sets and computational model will be transferred to onboard a particular harvester (e.g., combine harvester 20) in any of the ways and at the various times described above. This includes, for example, installing some or all of the data, logic, and optimized settings onto onboard controllers (e.g., controller 222) by the OEM at assembly and manufacture (or at some point afterward for a third party dealer or the like), or by wireless network transmission from a central or fleet command station (e.g., data center/server end 210).

At step 514, the method may query whether the optimization settings are for machine initialization or ongoing operation. For example, the IOSO system 202 may interrogate the operational state of the harvester to determine whether a harvesting operation is being performed that employs the systems to which the optimized settings pertain. If not, the method will initialize the pertinent systems by implementing the optimized settings derived by the modeling logic. After initialization, the method may then terminate 516.

If, instead, the IOSO system 202 determined at step 514 that the harvester is performing a harvesting operation or otherwise is to have its settings updated or optimized on an ongoing basis, at step 518, the method may then determine whether the optimized settings are to be provided to the harvester as operator recommendations or automated machine control commands. This assessment may be made by interrogating the onboard controller (e.g., controller 222) for feedback on the control strategy and/or automation aggressiveness of the particular harvester, or it may be carried out remotely (e.g., data center/server end 212). Depending on the outcome of this query, the optimized settings data will be either display to the operator, at step 520, (e.g., via the display device 32), or passed to the machine control architecture onboard the harvester (e.g., controller 222) to, at step 522, directly set, adjust, or otherwise control the actuators (e.g., actuators 226) of the pertinent systems autonomously (i.e., without any, or with limited, intervention by the operator) according to the optimized settings derived by the IOSO system 202.

As will be appreciated by one skilled in the art, certain aspects of the disclosed subject matter may be embodied as a method, system (e.g., an IOSO system and method per se or as included in an agricultural harvester), or computer program product. Accordingly, certain embodiments may be implemented entirely as hardware, entirely as software (including firmware, resident software, micro-code, etc.) or as a combination of software and hardware (and other) aspects. Furthermore, certain embodiments may take the form of a computer program product on a computer-usable storage medium having computer-usable program code embodied in the medium.

A computer readable signal medium may include a propagated data signal with computer readable program code embodied therein, for example, in baseband or as part of a carrier wave. Such a propagated signal may take any of a variety of forms, including, but not limited to, electromagnetic, optical, or any suitable combination thereof. A computer readable signal medium may be non-transitory and may be any computer readable medium that is not a computer readable storage medium and that may communicate, propagate, or transport a program for use by or in connection with an instruction execution system, apparatus, or device.

Embodiments of the present disclosure may be described herein in terms of functional and/or logical block components and various processing steps. It should be appreciated that such block components may be realized by any number of hardware, software, and/or firmware components configured to perform the specified functions. For example, an embodiment of the present disclosure may employ various integrated circuit components, e.g., memory elements, digital signal processing elements, logic elements, look-up tables, or the like, which may carry out a variety of functions under the control of one or more microprocessors or other control devices. In addition, those skilled in the art will appreciate that embodiments of the present disclosure may be practiced in conjunction with any number of systems, and that the work vehicles and the control systems and methods described herein are merely exemplary embodiments of the present disclosure.

For the sake of brevity, conventional techniques related to work vehicle and engine operation, control, and other functional aspects of the systems (and the individual operating components of the systems) may not be described in detail herein. Furthermore, the connecting lines shown in the various figures contained herein are intended to represent example functional relationships and/or physical couplings between the various elements. It should be noted that many alternative or additional functional relationships or physical connections may be present in an embodiment of the present disclosure.

The terminology used herein is for the purpose of describing particular embodiments only and is not intended to be limiting of the disclosure. As used herein, the singular forms "a", "an" and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof.

As used herein, unless otherwise limited or modified, lists with elements that are separated by conjunctive terms (e.g., "and") and that are also preceded by the phrase "one or more of" or "at least one of" indicate configurations or arrangements that potentially include individual elements of the list, or any combination thereof. For example, "at least one of A, B, and C" or "one or more of A, B, and C" indicates the possibilities of only A, only B, only C, or any combination of two or more of A, B, and C (e.g., A and B; B and C; A and C; or A, B, and C).

The description of the present disclosure has been presented for purposes of illustration and description, but it is not intended to be exhaustive or limited to the disclosure in the form disclosed. Many modifications and variations will be apparent to those of ordinary skill in the art without departing from the scope and spirit of the disclosure. Explicitly referenced embodiments herein were chosen and described in order to best explain the principles of the disclosure and their practical application, and to enable others of ordinary skill in the art to understand the disclosure and recognize many alternatives, modifications, and variations on the described example(s). Accordingly, various embodiments and implementations other than those explicitly described are within the scope of the following claims.

What is claimed is:

1. A harvester operating settings initialization method comprising:

receiving, by electronic control architecture having a processor and memory, a plurality of aggregated data sets pertaining to multiple parameters including harvester machine parameters, harvester environment parameters, and crop parameters;

applying, by the electronic control architecture, modeling logic to the plurality of aggregated data sets to determine a selected evaluation group from a plurality of evaluation groups each having multiple of the plurality of aggregated data sets, wherein the modeling logic includes:

generating a plurality of data constructs associated with the plurality of evaluation groups by processing the plurality of aggregated data sets associated with the plurality of evaluation groups using one or more statistical modeling techniques; and generating a plurality of scores for the plurality of evaluation groups by assessment of the plurality of data constructs according to one or more scoring pillars, wherein the selected evaluation group of the plurality of evaluation groups is determined based on the plurality of scores, and wherein the scoring pillars include a spread metric, a peak metric, and a generalization metric whereby:

the spread metric resolves a spread score that elevates the data constructs of the plurality of evaluation groups with aggregated data sets that vary by more than a minimum variance value and less than a maximum variance value, the peak metric resolves a peak score that elevates the data constructs of the plurality of evaluation groups with aggregated data sets that have a quantity of identifiable prominent peaks less than a maximum peak quantity value, and the generalization metric resolves a generalization score that elevates the data constructs of the plurality of evaluation groups with aggregated data sets that have a membership above a minimum membership value and less than a maximum membership value;

generating, by the electronic control architecture, an optimization settings data set for machine and crop combinations utilizing the selected evaluation group for one or more geospatial locations; and transferring the optimization settings data set from the electronic control architecture to an operating setting controller of a harvester for initializing settings of operational systems of the harvester.

2. The method of claim 1, wherein each of the plurality of evaluation groups includes a crop-specific set of the plurality of aggregated data sets and a machine-specific set of the plurality of aggregated data sets.

3. The method of claim 1, wherein the statistical modeling techniques include kernel density estimation and peak detection.

4. The method of claim 1, wherein the parameters comprising the plurality of aggregated data sets include harvester machine data, operator behavior data, crop data, soil data, weather data, and field image data.

5. The method of claim 4, wherein applying the modeling logic includes receiving machine and crop inputs identifying a unique one of the machine and crop combinations and applying to the harvester the optimization settings data set corresponding to the identified machine and crop combination.

6. The method of claim 5, wherein the machine and crop inputs are acquired from onboard the harvester or from offboard the harvester, and wherein, when acquired from offboard the harvester, the modeling logic includes receiving a field input in terms of a target field input and a harvest date input, in which the method further includes:

building a field geometry associated with the target field input;

acquiring environment and soil inputs associated with the target field input and the harvest date input;

determining anticipated field data associated with the environment and soil inputs for the field geometry; and incorporating the anticipated field data with the machine and crop inputs to identify the identified machine and crop combination.

7. The method of claim 1, wherein generating the optimization settings data set includes establishing a database of optimized settings data for multiple unique ones of the machine and crop combinations.

8. The method of claim 7, wherein the operational systems of the harvester include a cleaning fan, a thresher fan speed, a thresher, a chaffer, and a sieve.

9. The method of claim 1, wherein transferring the optimization settings data set from the electronic control architecture to the operating setting controller of a harvester includes transmitting the optimization settings data set to the harvester wirelessly from a remote facility during operation of the harvester.

10. The method of claim 1, further including displaying the optimization settings data set as a settings map on a display onboard the harvester.

11. A harvester operating settings initialization system comprising a non-transitory machine-readable medium containing instructions to direct a processor to:

receive a plurality of aggregated data sets pertaining to multiple parameters including harvester machine parameters, harvester environment parameters, and crop parameters;

apply modeling logic to the plurality of aggregated data sets to determine a selected evaluation group from a plurality of evaluation groups each having multiple of the plurality of aggregated data sets, wherein the modeling logic includes:

generating a plurality of data constructs associated with the plurality of evaluation groups by processing the plurality of aggregated data sets associated with the plurality of evaluation groups using one or more statistical modeling techniques; and generating a plurality of scores for the plurality of evaluation groups by assessment of the plurality of data constructs according to one or more scoring pillars, wherein the selected evaluation group of the plurality of evaluation groups is determined based on the plurality of scores, and wherein the scoring pillars include a spread metric, a peak metric, and a generalization metric whereby:

the spread metric resolves a spread score that elevates the data constructs of the evaluation groups with aggregated data sets that vary by more than a minimum variance value and less than a maximum variance value, the peak metric resolves a peak score that elevates the data constructs of the evaluation groups with aggregated data sets that have a quantity of identifiable prominent peaks less than a maximum peak quantity value, and the generalization metric resolves a generalization score that elevates the data constructs of the evaluation groups with aggregated data sets that have a membership above a minimum membership value and less than a maximum membership value;

generate an optimization settings data set for machine and crop combinations utilizing the selected evaluation group for one or more geospatial locations; and initialize operational systems of the harvester according to the optimization settings data set.

12. The system of claim 11, wherein each of the plurality of evaluation groups includes a crop-specific set of the plurality of aggregated data sets and a machine-specific set of the plurality of aggregated data sets.

13. The system of claim 11, wherein the statistical modeling techniques include kernel density estimation and peak detection.

14. The system of claim 11, wherein the parameters comprising the plurality of aggregated data sets include harvester machine data, operator behavior data, crop data, soil data, weather data, and field image data; and wherein the modeling logic receives machine and crop inputs that identify a unique one of the machine and crop combinations and applies to the harvester the optimization settings data set corresponding to the identified machine and crop combination.

15. The system of claim 14, wherein the machine and crop inputs are acquired from onboard the harvester or from offboard the harvester, and wherein, when acquired from offboard the harvester, the modeling logic includes receives a field input in terms of a target field input and a harvest date input, and the processor is directed to:

build a field geometry associated with the target field input;

acquire environment and soil inputs associated with the target field input and the harvest date input;

determine anticipated field data associated with the environment and soil inputs for the field geometry; and incorporate the anticipated field data with the machine and crop inputs to identify the identified machine and crop combination.

16. The system of claim 11, wherein the optimization settings data set are generated as a database of multiple unique ones of the machine and crop combinations; and wherein the operational systems of the harvester include a cleaning fan, a thresher fan, a thresher, a chaffer, and a sieve.

17. The system of claim 11, further including a display onboard the harvester displaying the optimization settings data set as a settings map.

* * * * *